(12) United States Patent
Lin et al.

(10) Patent No.: US 9,733,079 B2
(45) Date of Patent: Aug. 15, 2017

(54) DOUBLE-BEAD HORIZONTAL AND VERTICAL SPIRIT LEVEL, APPARATUS USING THE SPIRIT LEVEL, AND METHOD OF MEASURING DISTANCE AND HEIGHT BY USING THE APPARATUS

(71) Applicants: Li-Hua Lin, Tainan (TW); Po-Yu Wang, Tainan (TW); Chun-Yu Chang, Tainan (TW); Kang-Yu Wang, Tainan (TW)

(72) Inventors: Li-Hua Lin, Tainan (TW); Po-Yu Wang, Tainan (TW); Chun-Yu Chang, Tainan (TW); Kang-Yu Wang, Tainan (TW)

(*) Notice: Subject to any disclaimer, the term of this patent is extended or adjusted under 35 U.S.C. 154(b) by 122 days.

(21) Appl. No.: 14/884,820

(22) Filed: Oct. 16, 2015

(65) Prior Publication Data

US 2016/0116279 A1 Apr. 28, 2016

(30) Foreign Application Priority Data

| Oct. 24, 2014 | (TW) | 103218868 U |
| Dec. 11, 2014 | (TW) | 103222001 U |
| Dec. 19, 2014 | (TW) | 103222528 U |
| Sep. 3, 2015 | (TW) | 104129149 A |

(51) Int. Cl.
*G01C 9/34* (2006.01)
*G01C 9/10* (2006.01)

(52) U.S. Cl.
CPC ........ *G01C 9/34* (2013.01); *G01C 9/10* (2013.01)

(58) Field of Classification Search
CPC .................................. G01C 9/34; G01C 9/10
USPC .......................... 33/365, 371, 379, 381
See application file for complete search history.

(56) References Cited

U.S. PATENT DOCUMENTS

| 1,384,062 A | * | 7/1921 | Happle | G01C 9/34 |
| | | | | 33/379 |
| 1,752,112 A | * | 3/1930 | Severance | G01C 9/28 |
| | | | | 33/381 |
| 2007/0107242 A1 | * | 5/2007 | Montogmery | G01C 9/24 |
| | | | | 33/451 |

(Continued)

OTHER PUBLICATIONS

Department of Education, Taipei City Government, Tainan Municipal HouJia Junior High School, Certificate Nos. 10631287100, Jan. 22, 2017, 2 pages, Taiwan.

(Continued)

*Primary Examiner* — Yaritza Guadalupe-McCall
(74) *Attorney, Agent, or Firm* — Alan D. Kamrath; Kamrath IP Lawfirm, P.A.

(57) ABSTRACT

Disclosed is a double-bead horizontal and vertical spirit level having a transparent tube contains an air bubble, a basic liquid and bead insoluble in the basic liquid and having a density greater than that of the basic liquid. By comparing the relative positions of the air bubble and bead, the spirit level gives precise measurements. An apparatus using the spirit level and protractor can measure horizontal tilt angles of upper and lower surfaces, and vertical tilt angle of the vertical plane; it can also be further combined with a laser pen to measure the angle of elevation, distance, height of a remote object, tilt angles, draw a horizontal and plumb line. An apparatus where the long axis of spirit level is perpendicular to the axis of pivot, the long axis doesn't need to pass the axis of pivot and the space could be used to install a laser pen.

10 Claims, 22 Drawing Sheets

(56) References Cited

U.S. PATENT DOCUMENTS

| | | | | |
|---|---|---|---|---|
| 2007/0220765 A1* | 9/2007 | Montgomery | ........... | G01C 9/34 |
| | | | | 33/451 |
| 2009/0158605 A1* | 6/2009 | Montgomery | ........... | G01C 9/34 |
| | | | | 33/379 |
| 2016/0116279 A1* | 4/2016 | Lin | ........... | G01C 9/10 |
| | | | | 33/301 |

OTHER PUBLICATIONS

Department of Education, Taipei City Government, Tainan Chang Jung Senior High School, Certificate Nos. 10631287100, Jan. 22, 2017, 2 pages, Taiwan.
China Daily News, A Team Having Students from Different Schools being Awarded Gold Medal in IEYI (translated), online news, Feb. 28, 2017, 3 pages (including translation), www.cdns.com.tw/news.

* cited by examiner

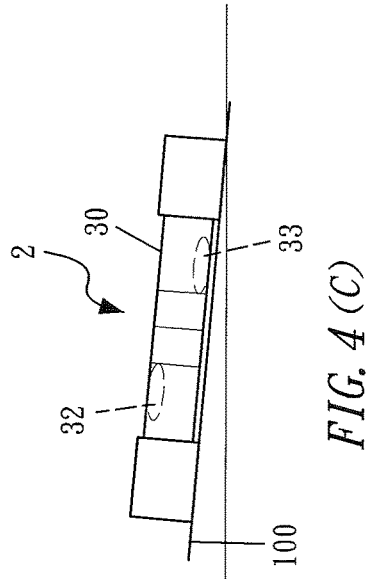
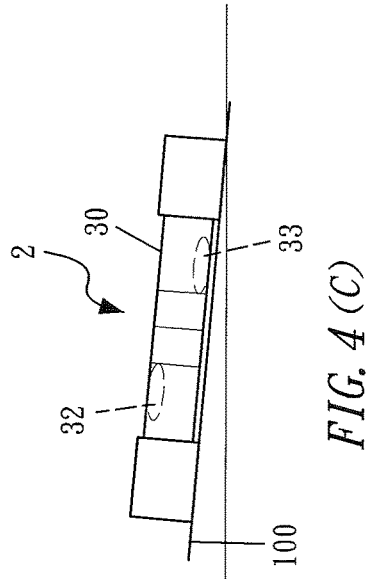
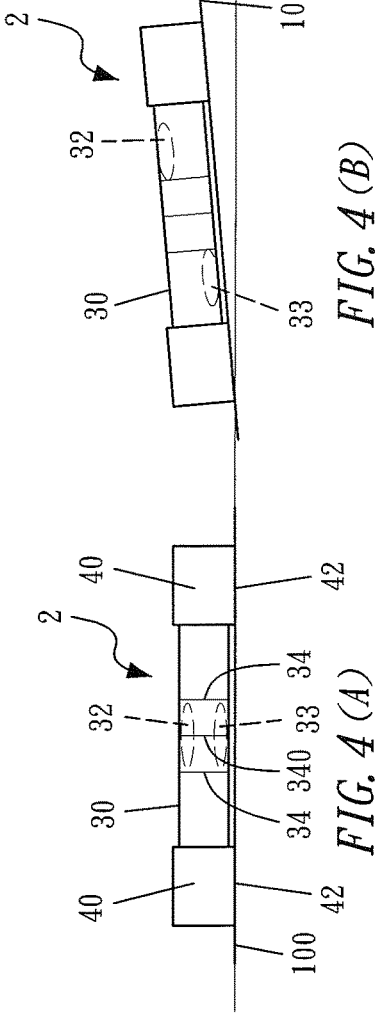
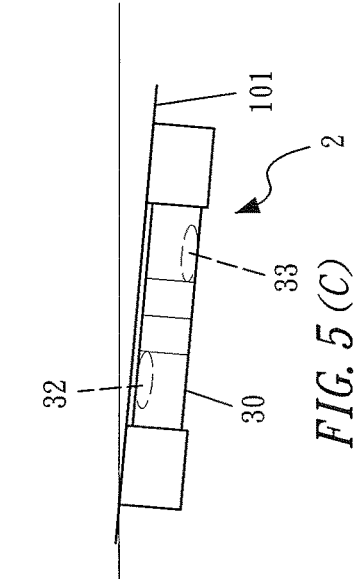
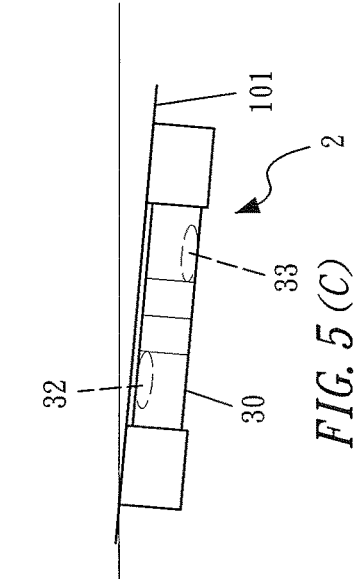
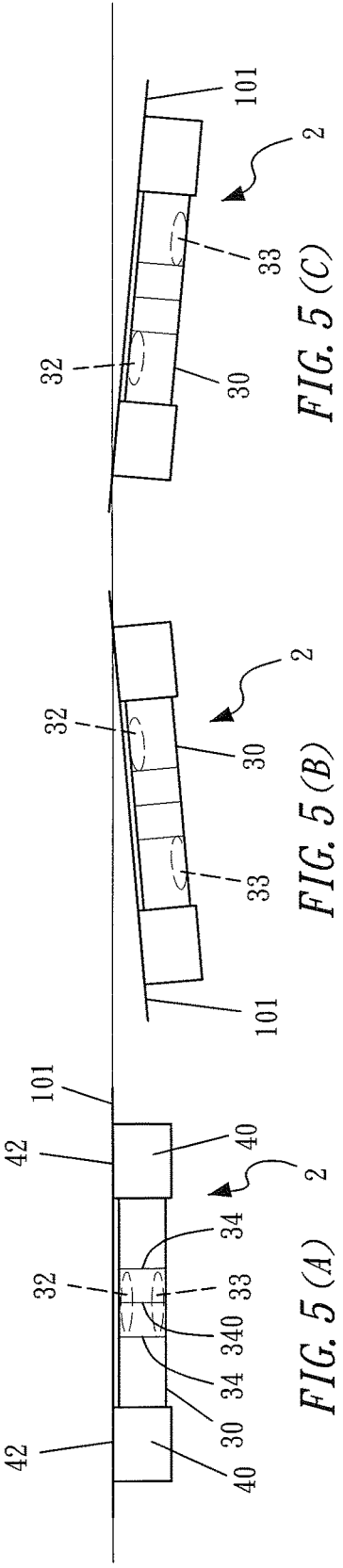

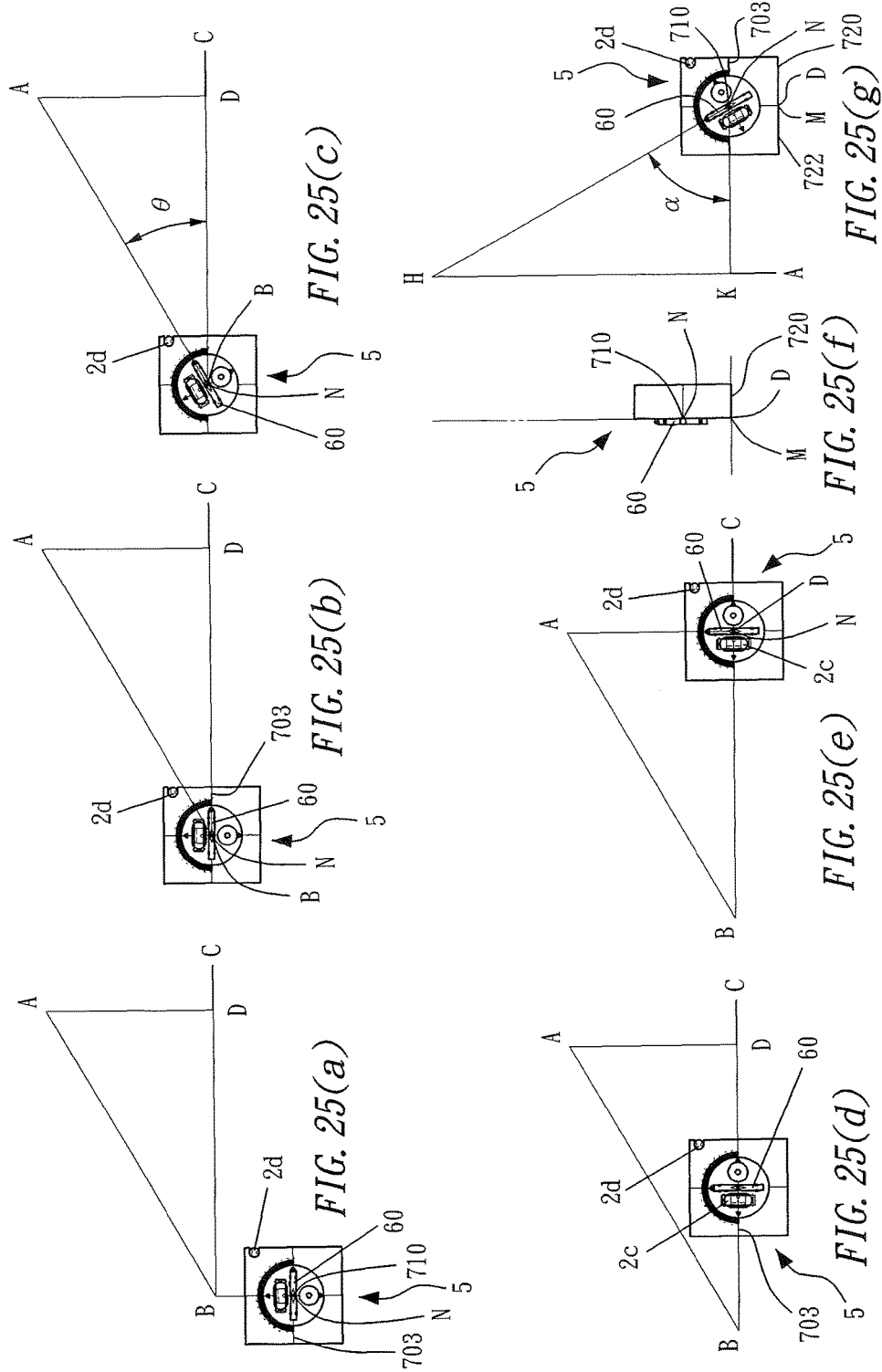

DOUBLE-BEAD HORIZONTAL AND VERTICAL SPIRIT LEVEL, APPARATUS USING THE SPIRIT LEVEL, AND METHOD OF MEASURING DISTANCE AND HEIGHT BY USING THE APPARATUS

BACKGROUND OF THE INVENTION

Field of the Invention

The present invention relates to a double-bead horizontal and vertical spirit level, an apparatus using the double-bead horizontal and vertical spirit level, and a method of measuring an angle or distance and height by using the apparatus. A transparent tube of the double-bead horizontal and vertical spirit level contains a basic liquid, an air bubble (bead 1) and a bead (bead 2, which may be liquid, colloid or solid, etc.) which is insoluble in the basic liquid and has a density greater than that of the basic liquid. With the comparison of the relative position of the two beads, the spirit level gives precise measurements. An apparatus using the double-bead horizontal and vertical spirit level and protractor can measure horizontal title angles of upper and lower surfaces, and vertical title angle of the vertical plane of the object. The apparatus can also be further combined with a laser pen to measure the tilt angels, and an angle of elevation of an object (such as the angle of elevation of a star) at a position where the laser light cannot reach and measure the distance and height of an object at a remote end, and to draw a horizontal and plumb line.

Description of the Related Art

With reference to FIG. 1 for a conventional column bubble level 1, in general, a conventional column bubble level 1 is composed of a base 10 and a transparent tube 20 (such as a glass tube or a plastic tube) fixed to the base 10. The inner wall at the middle of the transparent tube 20 slightly projects outward, and two longitudinal reference lines 21 are carved on both sides of the transparent tube 20 respectively, and the transparent tube is filled with a basic liquid 22 (such as water, alcohol or ether, etc.) filled in a tube, and a bubble 23. When the column bubble level 1 is used for measuring an object, users need to attach the column bubble level 1 to the upper surface of the object. If the bubble 23 is situated precisely at the mid-point of the two longitudinal reference lines 21, then the upper surface of the object is horizontal, or else the upper surface of the object is not horizontal. Although the simple type conventional column bubble level 1 can check whether or not the upper surface of the object is horizontal, it cannot measure the lower surface of the object (such as the ceiling of a room) effectively due to the difficulty of observation. The bubble 23 of the column bubble level 1 has a density smaller than the density of the basic liquid 22 in the transparent tube 20, so that the bubble 23 is always situated at the top of the column bubble level 1, when the column bubble level 1 keeps as flat. After the column bubble level 1 is placed at the lower surface of the object, the bubble 23 is limited and obstructed by the basic liquid 22 when a user views from bottom to top at the column bubble level 1, so that the measurement cannot be observed precisely. In addition, the conventional column bubble level 1 is relatively inaccurate, regardless of being used for measuring the horizontal plane of an object, or barely used as a vertical measuring tool. Obviously, the conventional column bubble level requires improvements.

SUMMARY OF THE INVENTION

In view of the aforementioned drawbacks of the prior art, the inventor of the present invention based on years of experience in the related industry to conduct extensive researches and experiments, and finally developed the double-bead horizontal and vertical spirit level apparatus to overcome the drawbacks of the prior art.

Therefore, it is a primary objective of the present invention to provide a double-bead horizontal and vertical spirit level capable of measuring a horizontal plane of both upper and lower surfaces or a vertical plane of an object more accurately.

Another objective of the present invention is to provide a double-bead horizontal and vertical spirit level apparatus capable of measuring the horizontal and vertical tilt angles of an object, and combine a laser pen to form a laser horizontal and vertical spirit level. In addition, a trigonometric function is used to calculate the distance or height of an object at a remote end.

To achieve the aforementioned and other objective, the present invention provides a double-bead horizontal and vertical spirit level. The invention is characterized in that the transparent tube contains a basic liquid, a bubble, and further contains a bead (such as a liquid, colloid or solid bead, etc.) which is insoluble in the basic liquid and has a density greater than that of the basic liquid. Therefore, the double-bead horizontal and vertical spirit level may be used as horizontal measuring tool for measuring both upper and lower surfaces of an object, and also be used as a vertical measuring tool of the object. In addition, the relative positions of the two beads are compared during the measurement, so that a more precise measurement can be achieved. If a protractor with a pivot axis is added, then the apparatus will be able to measure the horizontal tilt angle as well as the vertical tilt angle, and the comparison by the two beads will be more accurate. If a laser pen is added, then the apparatus will be able to replace the conventional laser horizontal and vertical measuring instrument.

The double-bead horizontal and vertical spirit level of the present invention may be combined with a protractor and/or a laser pen to form a double-bead horizontal and vertical spirit level apparatus, wherein the double-bead horizontal and vertical spirit level is used for examining whether or not the position of disposing the apparatus is horizontal/vertical; and the protractor has a pivot axis passing through the center and being perpendicular to a plane of the protractor plane, and the long axis of the laser pen perpendicularly intersects the pivot axis, so that the double-bead horizontal and vertical spirit level apparatus can measure an angle of elevation of an object at a remote end (such as the angle of elevation of a star). In addition, the double-bead horizontal and vertical spirit level apparatus can also measure an included angle of an object at a remote end and then calculate the distance and height of the object at a remote end by a trigonometric function.

BRIEF DESCRIPTION OF THE DRAWINGS

FIGS. 4(A), (B), and (C) show a double-bead horizontal and vertical spirit level in accordance with the present invention applied for measuring an upper surface of an object;

FIGS. 5(A), (B), and (C) show a double-bead horizontal and vertical spirit level in accordance with the present invention applied for measuring a lower surface of an object;

FIGS. 25(a), (b), (c), (d), (e), (f) and (g) are the schematic views of operating the third type of a double-bead horizontal and vertical spirit level apparatus in accordance with the present invention to measure the distance and height of an object at a remote end.

DETAILED DESCRIPTION OF THE PREFERRED EMBODIMENTS

The technical characteristics, contents, advantages and effects of the present invention will be apparent with the detailed description of a preferred embodiment accompanied with related drawings as follows.

Figure 1:
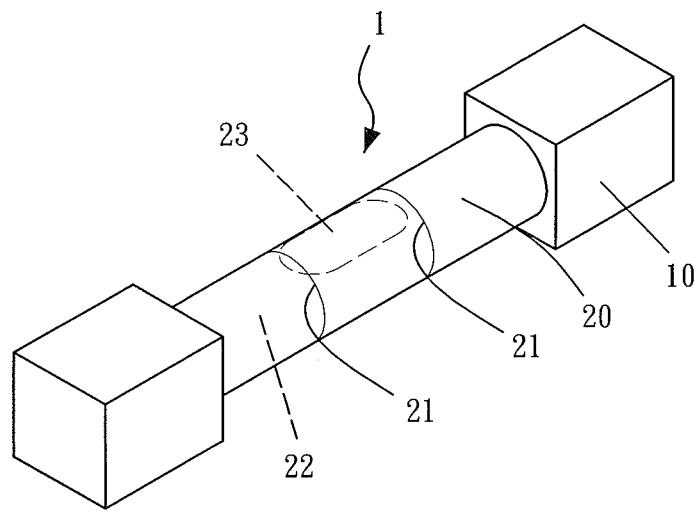
FIG. 1 is a perspective view of a conventional column bubble level.
Figure 2:
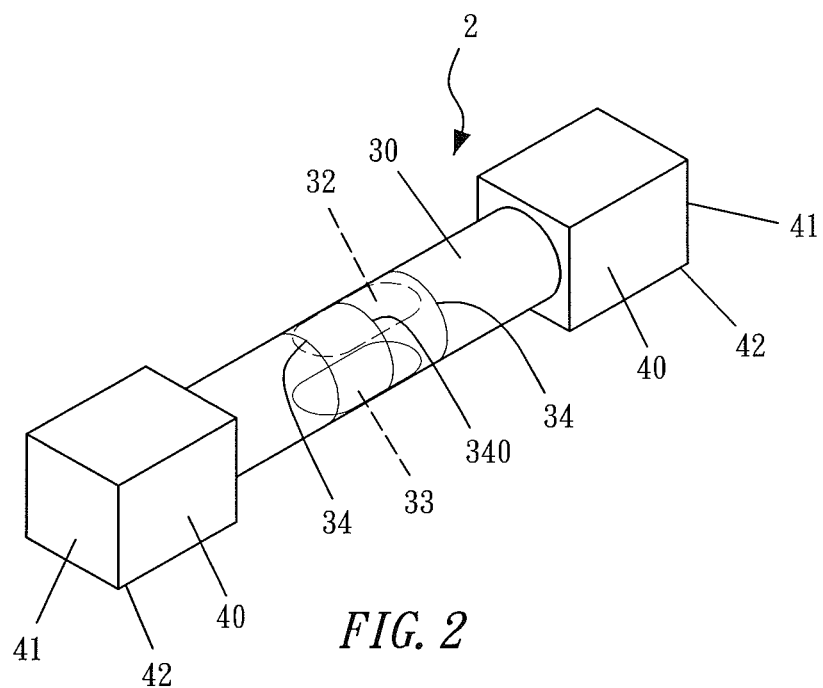
FIG. 2 is a perspective view of a double-bead horizontal and vertical spirit level in accordance with the present invention.
Figure 3:
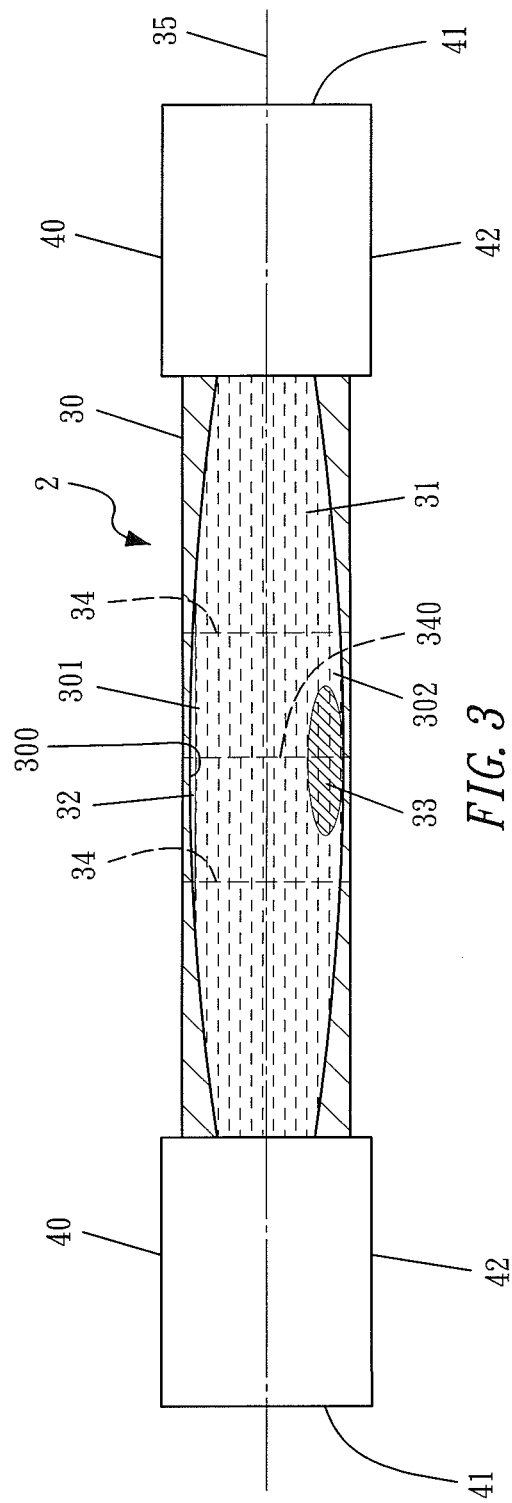
FIG. 3 is a cross-sectional view of a double-bead horizontal and vertical spirit level in accordance with the present invention.

With reference to FIGS. 2 and 3 for a double-bead horizontal and vertical spirit level 2 in accordance with a preferred embodiment of the present invention, the double-bead horizontal and vertical spirit level 2 comprises a transparent tube 30. The internal tube diameter of the transparent tube 30 is tapered from the middle position 300 to both ends, and the transparent tube 30 has the maximum internal tube diameter at the middle position 300 and the minimum internal tube diameter at both ends (as shown in FIG. 3) or the internal tube diameter is all the same in whole tube. The transparent tube 30 contains a basic liquid 31 (such as water, alcohol or ether, etc.), a bubble 32, and an insoluble liquid, colloid or spherical solid bead (or simply a bead 33 which may be a carbon tetrachloride, mercury, colloid or spherical solid bead) in the basic liquid 31 and having a density greater than that of the basic liquid 31, and the bubble 32 and bead 33 are called the two beads. The outer wall of the transparent tube 30 has a longitudinal middle reference line 340 and left and right reference lines 34 carved at the relative positions including the middle position 300 and both ends respectively.

The transparent tube 30 comes with two bases 40 disposed at both ends of the transparent tube 30 passing through a long axis 35 of the tube center. Both bottom surfaces 42 of the two bases 40 are parallel to the long axis 35, and a connecting surface of the two bottom surfaces 42 is also parallel to the long axis 35. Two outer vertical end surfaces 41 of the two bases 40 are perpendicular to the long axis 35 and the bottom surface 42. The horizontal axis, vertical axis and depth axis of the two bases 40 are perpendicular to one another.

With reference to FIG. 4 for a double-bead horizontal and vertical spirit level in accordance with a preferred embodiment of the present invention applied for measuring an upper surface of an object, the bottom surfaces 42 of the two bases 40 of the double-bead horizontal and vertical spirit level 2 are attached to a desired measuring upper surface 100. In FIG. 4(A), the bubble 32 and bead 33 are disposed at the top and bottom between the left and right reference lines 34 of the transparent tube 30 respectively, and the vertical center lines of the bubble 32 and the bead 33 are aligned precisely with a middle reference line 340, indicating that the upper surface 100 of the object is horizontal. If the upper surface 100 of the object tilts towards the lower left side, then the bubble 32 will shift to the upper right side, and the bead 33 will shift to the lower left side as shown in FIG. 4(B); if the upper surface 100 of the object tilts towards the lower right side as shown in FIG. 4(C), then the bubble 32 will shift to the upper left side, and the bead 33 will shift to the lower right side, indicating that the upper surface 100 of the object is not horizontal as shown in FIGS. 4(B) and 4(C).

With reference to FIG. 5 for a double-bead horizontal and vertical spirit level in accordance with a preferred embodiment of the present invention applied for measuring a lower surface of an object, the bottom surfaces 42 of the two bases 40 of the double-bead horizontal and vertical spirit level 2 are attached to a desired measuring lower surface 101.

In FIG. 5(A), the bubble 32 and the bead 33 are disposed at the top and bottom between the left and right reference lines 34 of the transparent tube 30 respectively, and the vertical center lines of the bubble 32 and the bead 33 are aligned precisely with a middle reference line 340, indicating that the lower surface 101 of the object is horizontal. If the lower surface 101 of the object tilts towards the lower left side, then the bubble 32 will shift to the upper right side and the bead 33 will shift to the lower left side as shown in FIG. 5(B); if the lower surface 101 of the object tilts towards the lower right side, then the bubble 32 will shift to the upper left side, and the bead 33 will shift to the lower right side as shown in FIG. 5(C), indicating that the lower surface 101 of the object is not horizontal as shown in FIGS. 5(B) and 5(C).

Figure 6:
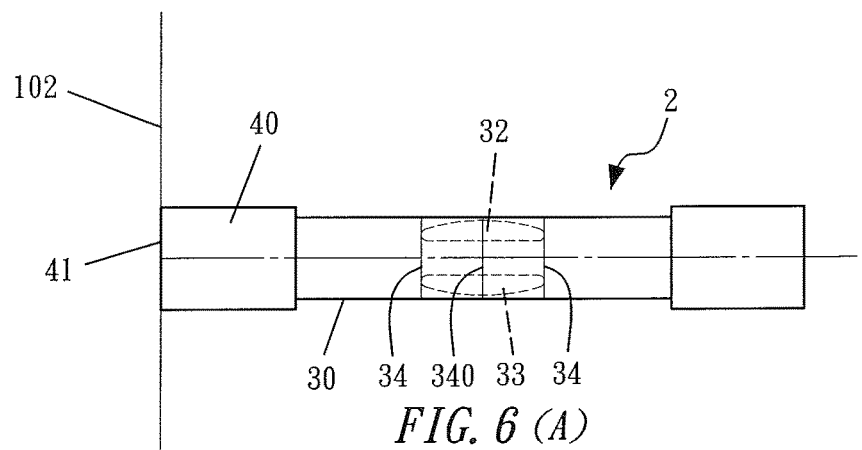
FIGS. 6 (A), (B), and (C) show a double-bead horizontal and vertical spirit level in accordance with the present invention applied for measuring a vertical plane of an object.
Figure 6:
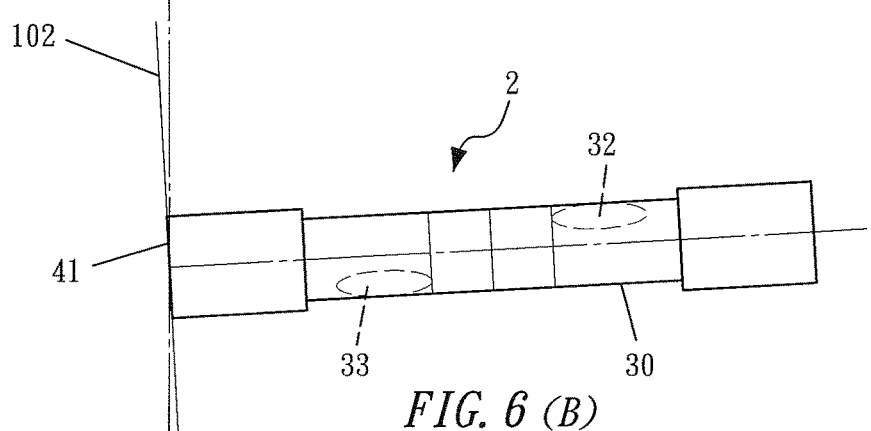
Figure 6:
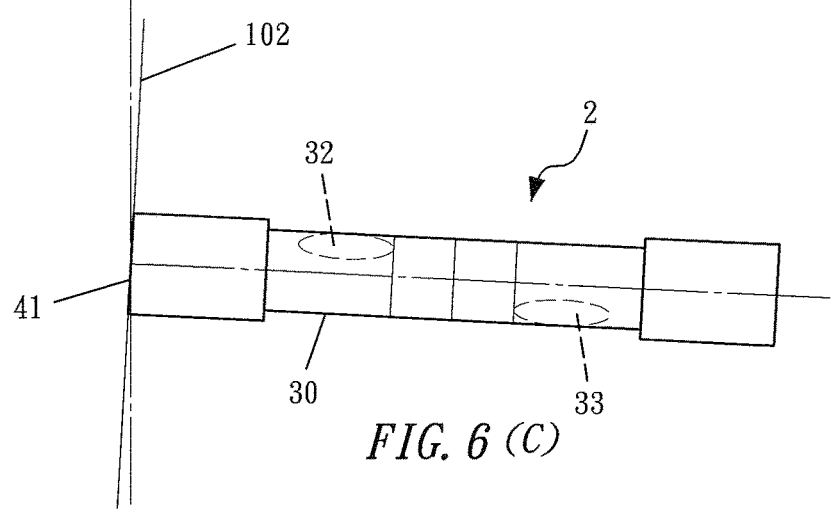

With reference to FIG. 6 for a double-bead horizontal and vertical spirit level in accordance with the present invention applied for measuring a vertical plane of an object, the vertical end surface 41 of any one of the bases 40 of the double-bead horizontal and vertical spirit level 2 is attached to a desired measuring vertical plane 102. In FIG. 6(A), the bubble 32 and the bead 33 are disposed at the middle of two longitudinal left and right reference lines 34, and the vertical center lines of the bubble 32 and the bead 33 are aligned precisely with a middle reference line 340, indicating that the vertical plane 102 of object is vertical; if the vertical plane 102 of the object tilts to the left, then the bubble 32 will shift to the upper right side and the bead 33 will shift to the lower left side as shown in FIG. 6(B); if the vertical plane 102 of the object tilts to the right side, then the bubble 32 will shift to the upper left side, and the bead 33 will shift to the lower right side as shown in FIG. 6(C), indicating that the vertical plane 102 of the object is not vertical as shown in FIGS. 6(B) and 6(C).

Figure 7:
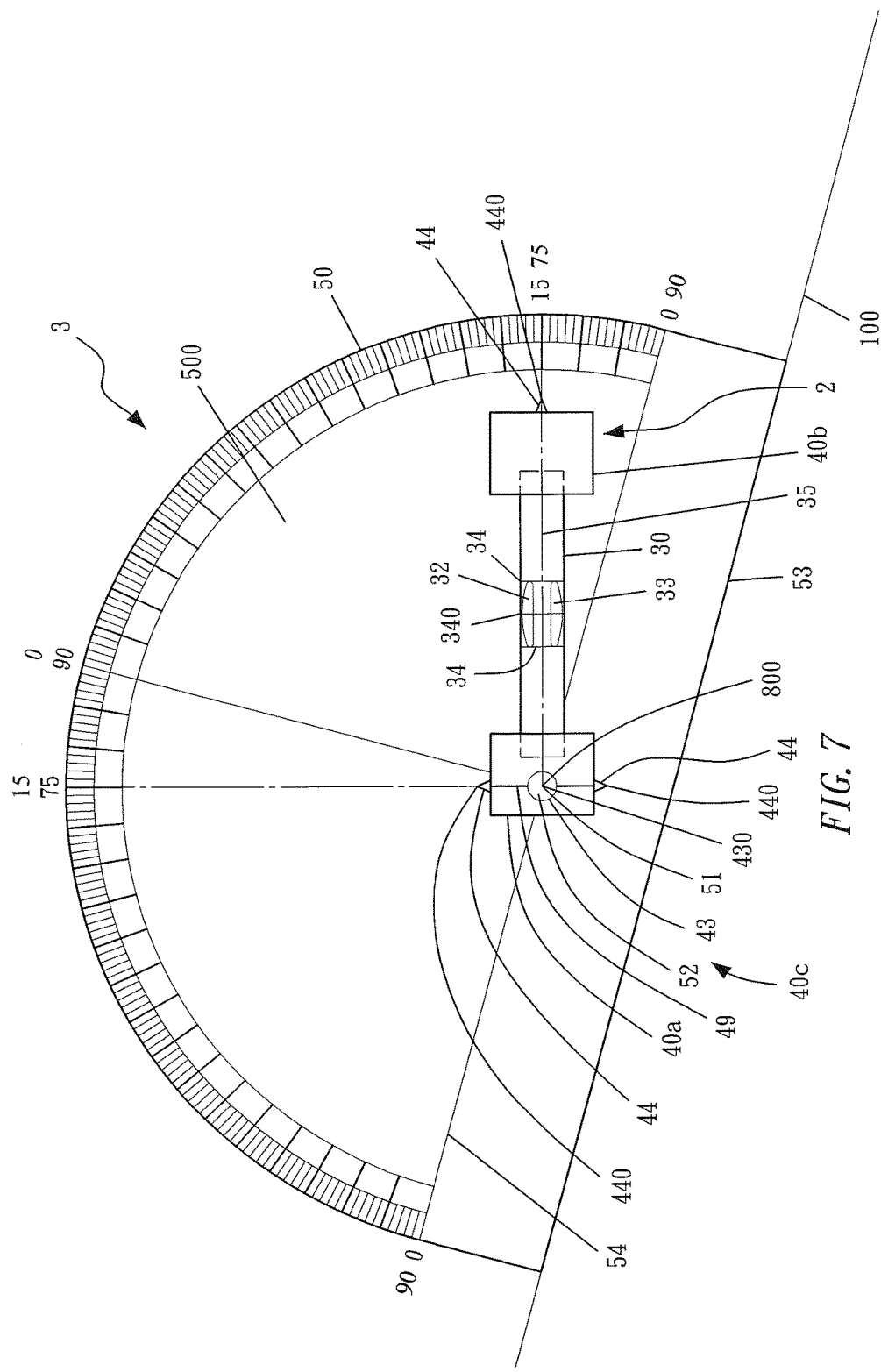
FIG. 7 shows a first type of a double-bead horizontal and vertical spirit level apparatus in accordance with the present invention applied for measuring a horizontal tilt angle of an upper surface of an object.
Figure 8:
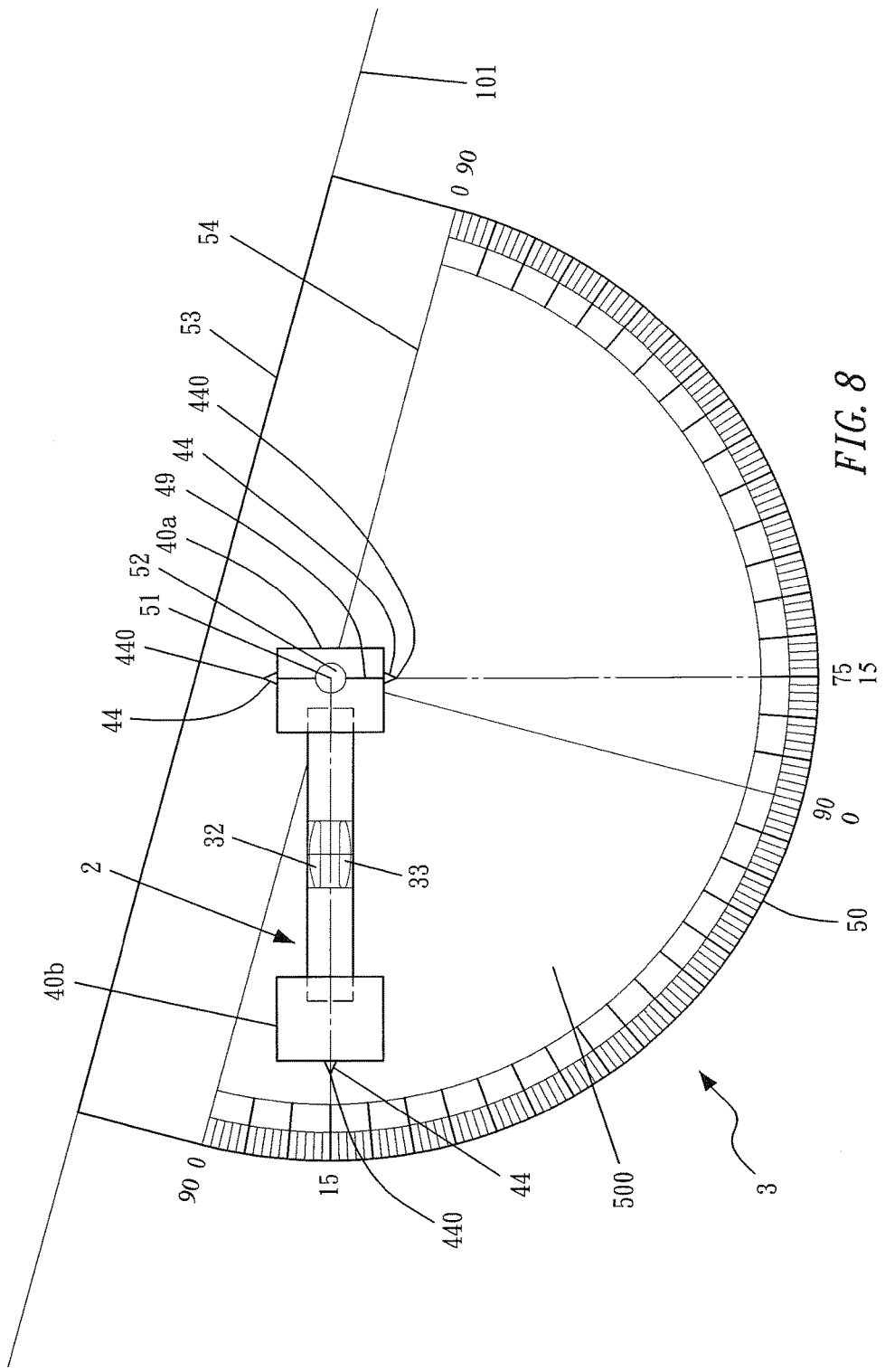
FIG. 8 shows a first type of a double-bead horizontal and vertical spirit level apparatus in accordance with the present invention applied for measuring a horizontal tilt angle of a lower surface of an object.
Figure 9:
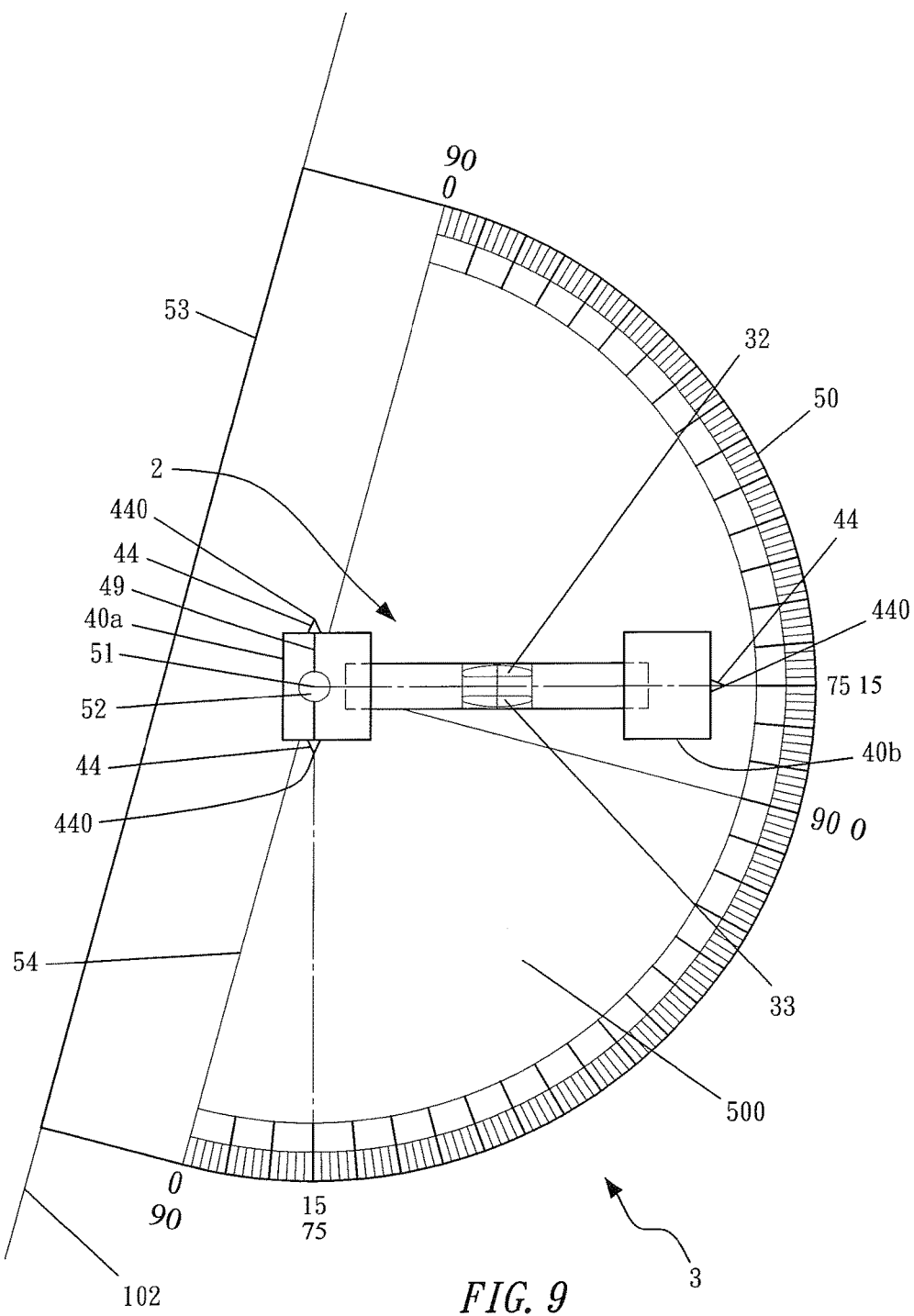
FIG. 9 shows a first type of a double-bead horizontal and vertical spirit level apparatus in accordance with the present invention applied for measuring a vertical tilt angle of a vertical plane of an object.
Figure 10:
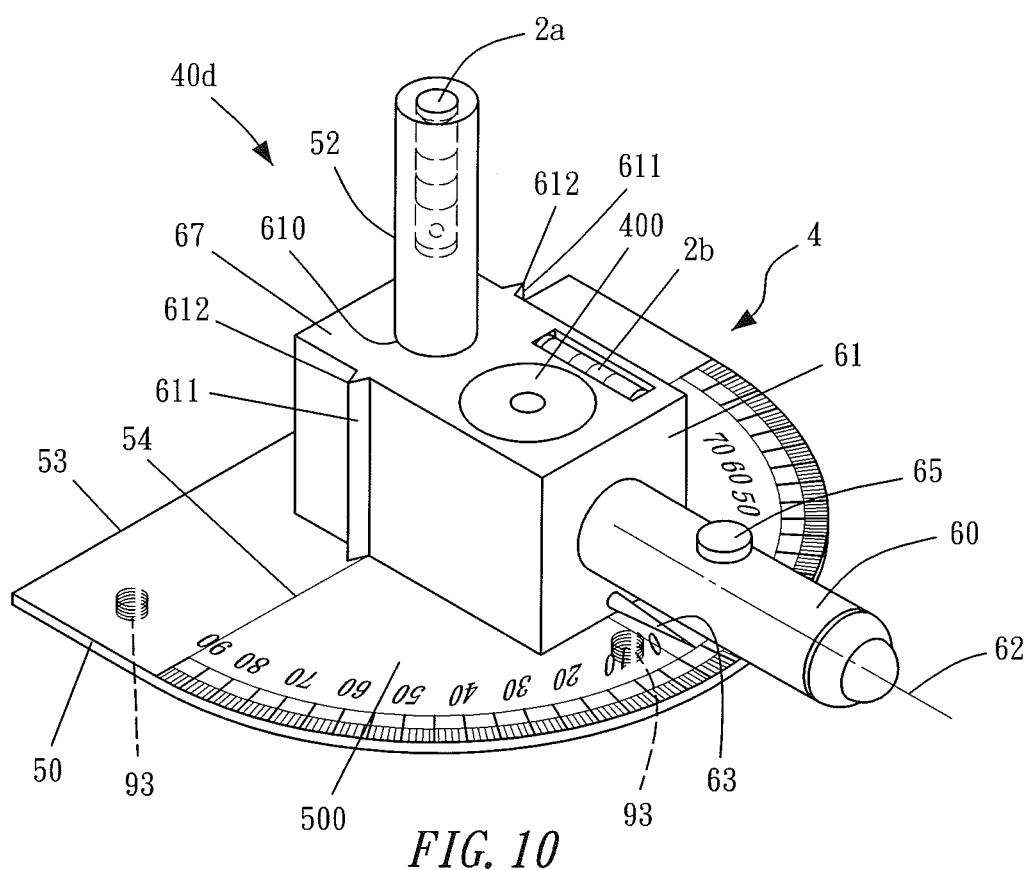
FIG. 10 is a perspective view of a second type of a double-bead horizontal and vertical spirit level apparatus in accordance with the present invention.
Figure 11:
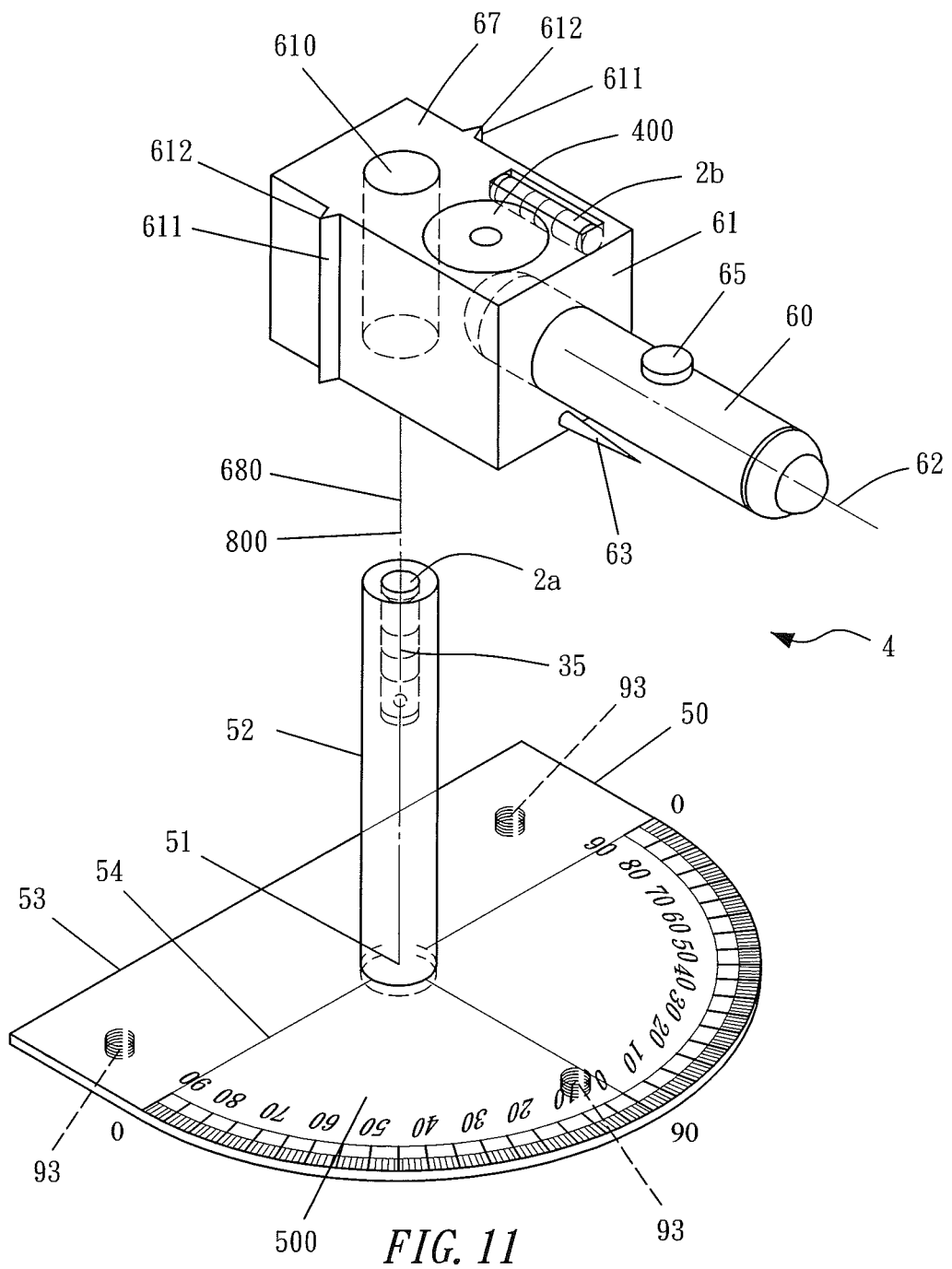
FIG. 11 is an exploded view of the second type of a double-bead horizontal and vertical spirit level apparatus in accordance with the present invention.
Figure 12:
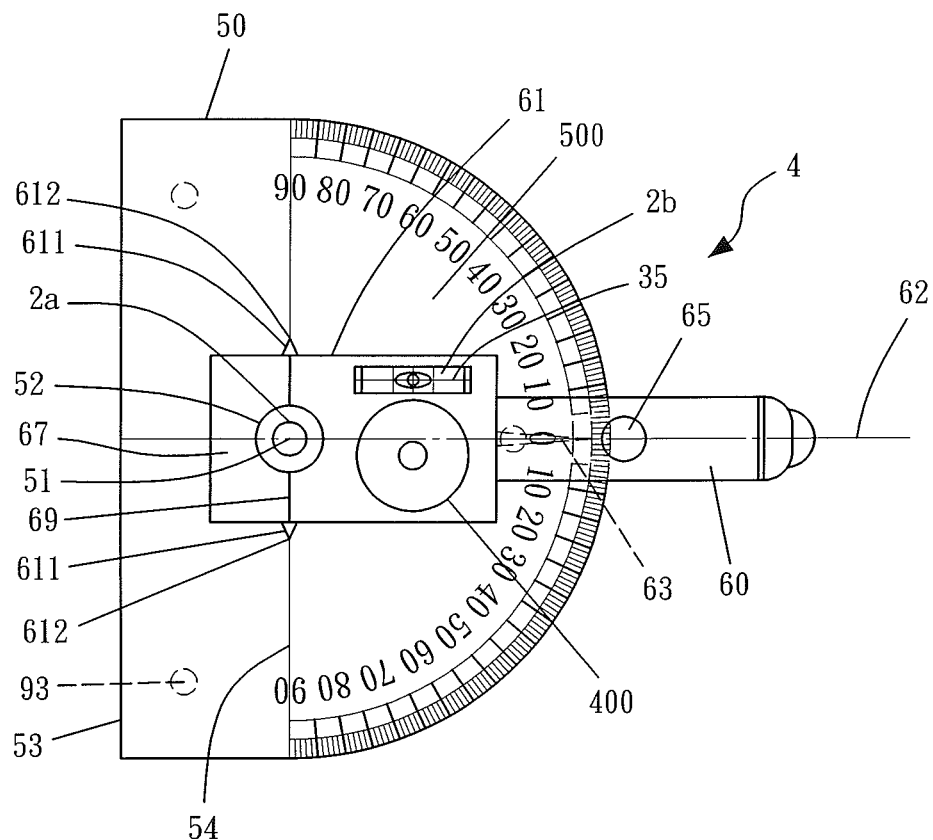
FIG. 12 is a top view of the second type of a double-bead horizontal and vertical spirit level apparatus in accordance with the present invention.
Figure 13:
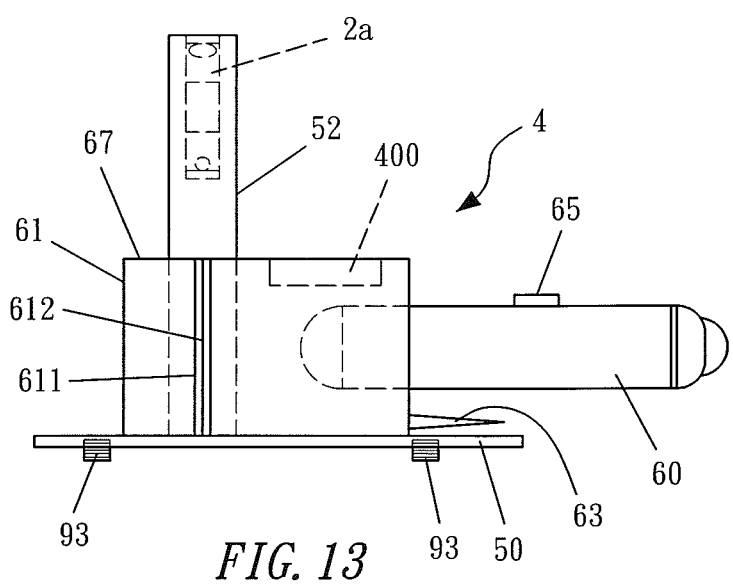
FIG. 13 is a side view of the second type of a double-bead horizontal and vertical spirit level apparatus in accordance with the present invention.

With reference to FIGS. 7-9 for a double-bead horizontal and vertical spirit level 2 of the present invention combined with a protractor 50 to form a first type of a double-bead horizontal and vertical spirit level apparatus 3, and the double-bead horizontal and vertical spirit level 2 has a long axis 35 parallel to a protractor plane 500. In the two bases 40 of the double-bead horizontal and vertical spirit level 2 as shown in FIGS. 2 and 3, one of them is a pivoting base 40a, and the other one is a rotated base 40b, wherein the pivoting base 40a has an axial hole 43, and the axial hole 43 has an axis line 430, and the axis line 430 is perpendicular to the protractor plane 500. The protractor 50 has a diameter baseline 54, and both ends of the diameter baseline 54 are carved with a reference scale 0° or 90° or 180°, and a pivot 52 is installed at a position of the center 51 of the diameter baseline 54 perpendicular to the protractor plane 500, and the pivot 52 has an axis 800 superimposed with the axis line 430 and limited to pass through the center 51 and perpendicular to the long axis 35 of the double-bead horizontal and vertical spirit level 2. The axial hole 43 of the pivoting base 40a has a hole diameter substantially equal to the external diameter of the pivot 52, and the axial hole 43 is provided for passing the pivot 52, and both axial hole 43 and the pivot 52 constitute a pivoting means 40c that provides a pivoting function for pivoting the protractor 50 installed to the double-bead horizontal and vertical spirit level 2. The pivoting base 40a has a first isosceles triangle indicating cone 44 arranged separately on two sidewalls parallel to the pivot 52 and the long axis 35, and each of the two first isosceles triangles indicating cone 44 has a first pointer at a first pointed-conical end 440, the connecting line 49 of the two first pointed-conical ends 440 at an equal-height position is perpendicular to the long axis 35, and perpendicularly intersects with the axis 800 and the axis line 430. The outer end wall of the rotated base 40b perpendicular to the long axis 35 has an indicating cone with a second isosceles triangle 44, and the indicating cone with a second isosceles triangle 44 has a second pointer at a second pointed-conical end 440, and the second pointed-conical end 440 has a pointing direction parallel to the pointing direction of the long axis 35 of the double-bead horizontal and vertical spirit level 2, and whose opposite direction passes through the center of the protractor or perpendicularly intersects the axis of the pivot (and the second pointer at the second pointed-conical end 440 may be set at any position of one of the pivoting base 40a and the rotated base 40b as long as the pointing direction is parallel to the pointing direction of the long axis 35 of the double-bead horizontal and vertical spirit level 2 and whose opposite direction passes through the center of the protractor or perpendicularly intersects the axis of the pivot) and the protractor 50 has a basal surface 53 parallel to the diameter baseline 54 and perpendicular to a plane 500 of the protractor 50. To attach the basal surface 53 to the object, the protractor is vertically erected. If the surface of the object is in a horizontal state, then the three pointed-conical ends 440 are corresponsive to the 0° or 90° scale positions of the protractor 50. In addition, the pointed-conical end 440 may be used for reading the pivoting angle of the double-bead horizontal and vertical spirit level 2. In the process of checking whether the upper surface 100 of an object is horizontal or measuring a tilt angle as shown in FIG. 7, the basal surface 53 of the protractor 50 is attached to the upper surface 100 of the object, and then the double-bead horizontal and vertical spirit level 2 is pivoted to a horizontal state. Now, the scale of the protractor 50 corresponsive to the pointed-conical end 440 gives the reading of the horizontal tilt angle of the upper surface 100 of the object or shows whether or not the upper surface 100 is horizontal. In FIG. 8, the basal surface 53 of the protractor 50 is attached to the lower surface 101 of the object, and then the double-bead horizontal and vertical spirit level 2 is pivoted to a horizontal state. Now, the scale of the protractor 50 corresponsive to the pointed-conical end 440 gives the reading of the horizontal tilt angle of the lower surface 101 of the object or shows whether or not the lower surface 101 is horizontal. In FIG. 9, the basal surface 53 of the protractor 50 is attached to the vertical plane 102 of the object, and then the double-bead horizontal and vertical spirit level 2 is pivoted to a horizontal state. Now, the scale of the protractor 50 corresponsive to the pointed-conical end 440 gives the reading of the vertical tilt angle of the vertical plane 102 of the object or shows whether or not the vertical plane 102 is vertical.

The double-bead horizontal and vertical spirit level 2 is pivot able on the protractor 50 by the pivoting means 40c. In FIGS. 7-9, the axial hole 43 of the pivoting base 40a is sheathed on the pivot 52 perpendicularly protruded from the protractor center 51, and the pivoting means 40c could be an axial hole 43 of the pivoting base 40a becoming a protruded pivot and the pivot 52 of the protractor center 51 becomes as an axial hole, and such pivot is inserted into an axial hole of the protractor center 51, wherein the center of the protractor, the center of the axial hole, and the center of the pivot are superimposed at the same point, and the long axis 35 of the double-bead horizontal and vertical spirit level 2 is perpendicular to the axis of the pivot. The pointing directions of the first and second pointed-conical ends are perpendicular or parallel to the long axis of the double-bead horizontal and vertical spirit level 2 respectively, and whose opposite direction must pass through center of the protractor or perpendicularly pass through the axis of the pivot, and the pointing directions of the first and second pointed-conical ends show the pivoting angle reading of the double-bead horizontal and vertical spirit level 2.

In the measurement as shown in FIGS. 7~9, if another double-bead horizontal and vertical spirit level 2 with a long axis 35 perpendicular to the protractor plane 500 is added while maintaining this new double-bead horizontal and vertical spirit level 2 at a horizontal state to confirm that the protractor plane 500 is vertically erected, then the old double-bead horizontal and vertical spirit level 2 is pivoted to the horizontal state to obtain a more accurate measurement.

The double-bead horizontal and vertical spirit level 2 of the double-bead horizontal and vertical spirit level apparatus 3 could be replaced with a column bubble level 1 as well if the precise requirement is not stated.

With reference to FIGS. 10~13 for a second type of a double-bead horizontal and vertical spirit level apparatus 4 in accordance with the present invention, the apparatus 4 comprises a protractor 50 and a laser pen 60 combined with the double-bead horizontal and vertical spirit level 2, wherein the protractor 50 has a diameter baseline 54, and both ends of the diameter baseline 54 are carved with a reference scale 0° or 90° or 180°, and a pivot 52 is fixed to the position of the center 51 of the diameter baseline 54 perpendicular to the protractor 50, and an axis 800 of the pivot 52 is limited to passing through the center 51. The double-bead horizontal and vertical spirit level apparatus 4 has two double-bead horizontal and vertical spirit levels 2a and 2b, wherein the long axis 35 of the double-bead horizontal and vertical spirit level 2a is parallel to the axis 800 of the pivot 52 (and the double-bead horizontal and vertical spirit level 2a may be set at any position, as long as the long axis 35 is parallel to the axis 800), the double-bead horizontal and vertical spirit level 2b and the laser pen 60 are mounted on a carrier 61, and the horizontal axis, vertical axis and depth axis of the carrier 61 are perpendicular to one another. The long axis 35 of the double-bead horizontal and vertical spirit level 2b, the long axis 62 of the laser pen 60, and the top surface 67 and bottom surface of the carrier 61 are parallel to the plane 500 of the protractor, and the carrier 61 has an axial hole 610, and the axial hole 610 has an axis line 680 are superimposed with the axis 800. The long axis 35 of the double-bead horizontal and vertical spirit level 2b is perpendicular to the axis 800 and parallel to the long axis 62 of the laser pen 60. The axial hole 610 has a hole diameter substantially equal to the external diameter of the pivot 52, and the axial hole 610 is provided for passing the pivot 52, and both of the axial hole 610 and the pivot 52 constitute a pivoting means 40d, so that the double-bead horizontal and vertical spirit level 2b and the laser pen 60 mounted onto the carrier 61 provide the pivoting function of the protractor 50. A pointer 63 is disposed precisely under the laser pen 60 and extended from an end surface of the carrier 61, and the center axis of the pointer 63 with respect to the vertical projection of the plane 500 and the long axis 62 of the laser pen 60 with respect to the vertical projection of the plane 500 are superimposed, so that the long axis 62 and the center axis of the pointer 63 perpendicularly intersect the axis 800, and the pointer 63 is provided for reading the pivoting angle of the laser pen 60 or the double-bead horizontal and vertical spirit level 2b. Each of both sidewalls of the carrier 61 parallel to the pivot 52 and parallel to the long axis 35 of the double-bead horizontal and vertical spirit level 2b has a third isosceles triangle indicating cone 611, and each of the two third isosceles triangle indicating cones 611 has a third pointer at a third pointed-conical end 612, and a connecting line 69 of the two third pointed-conical ends 612 at equal-height positions is perpendicular to both the long axis 62 of the laser pen 60 and the long axis 35 of the double-bead horizontal and vertical spirit level 2b, and perpendicularly intersects both the axis 800 and the axis line 680, and the two third pointed-conical ends 612 or pointers 63 can be used for reading a pivoting angle of the laser pen 60 or the double-bead horizontal and vertical spirit level 2b. In addition, a circular bubble level 400 may be placed horizontally on the top surface 67 of the carrier 61 and set parallel to the top surface 67 of the carrier 61 and parallel to the plane 500 of the protractor 50 to facilitate users to observe whether or not the top surface 67 of the carrier 61 and the plane 500 of the protractor 50 are horizontal. The back side of the protractor 50 has three adjusting screws 93 for adjusting the circular bubble level 400 to a horizontal state after the back side of the protractor 50 is arranged to face downward, and then the laser pen 60 is rotated to emit a laser light in order to draw a horizontal line on a wall, so as to replace the application of the laser level. The basal surface 53 of the protractor 50 is arranged to face downward, and the protractor 50 is vertically erected. After the double-bead horizontal and vertical spirit level 2a is maintained at a horizontal state, the plane 500 of the protractor 50 will be vertically erected from the horizontal plane, and the laser pen 60 is rotated to emit a laser light to draw a plumb line on a wall.

Figure 14:
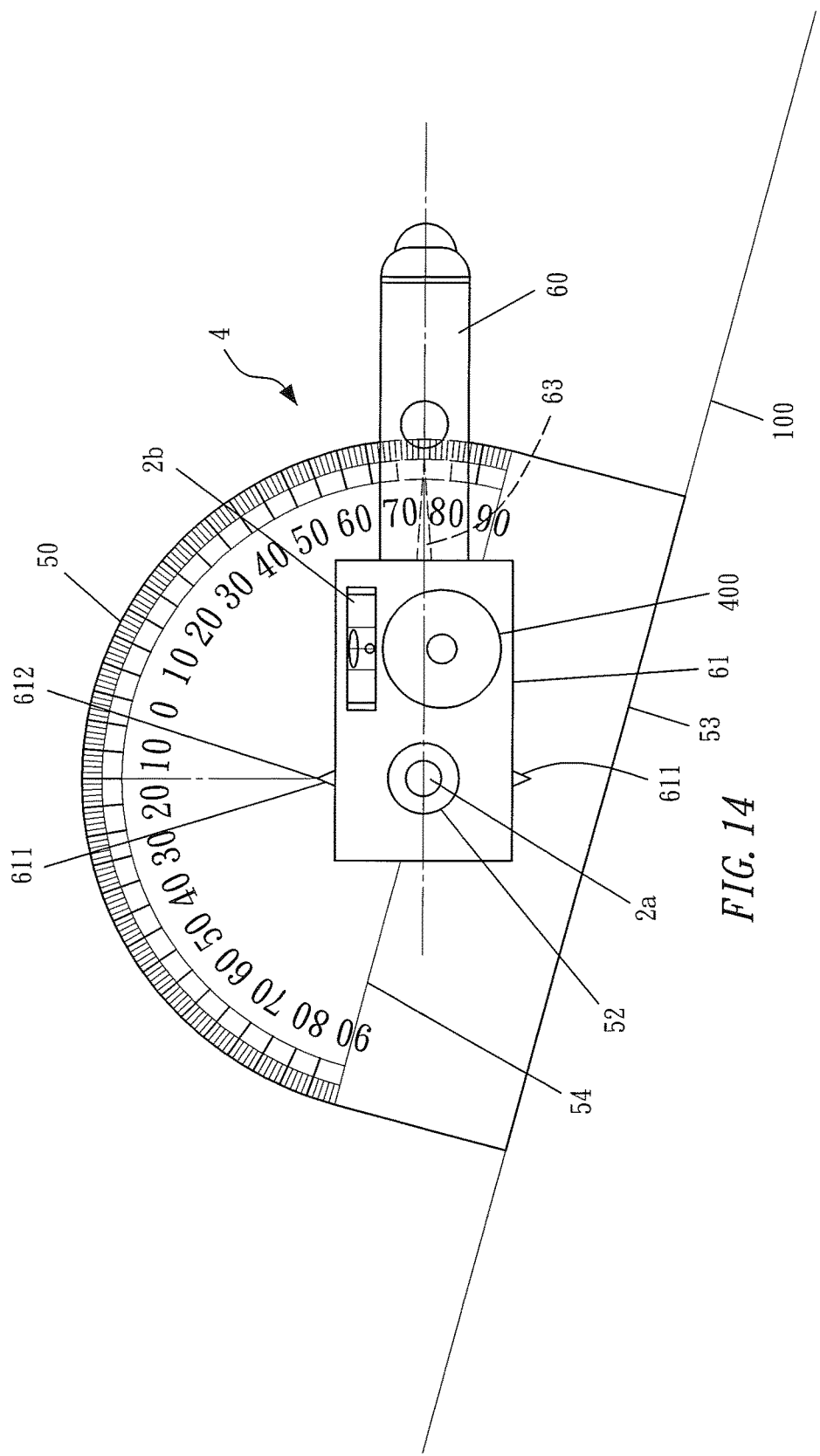
FIG. 14 shows the second type of a double-bead horizontal and vertical spirit level apparatus in accordance with the present invention applied for measuring a horizontal tilt angle of an upper surface of an object.

In the figures from FIG. 14 onward, the small oval shown in the double-bead horizontal and vertical spirit level represents the bubble, and the small circle represents a bead (which is a liquid, colloid or solid bead) insoluble in the basic liquid and having a density greater than that of basic liquid.

Figure 15:
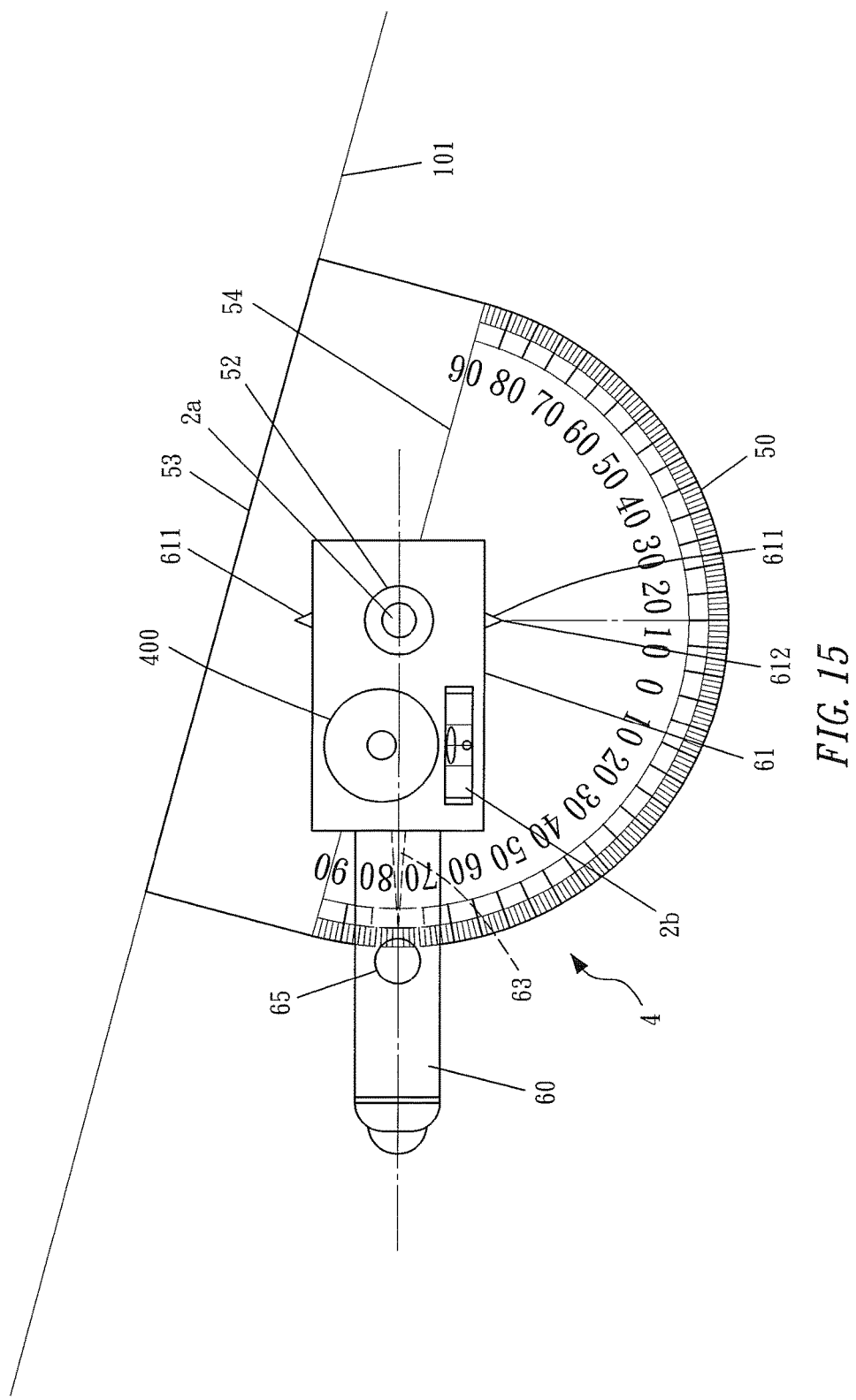
FIG. 15 shows the second type of a double-bead horizontal and vertical spirit level apparatus in accordance with the present invention applied for measuring a horizontal tilt angle of a lower surface of an object.
Figure 16:
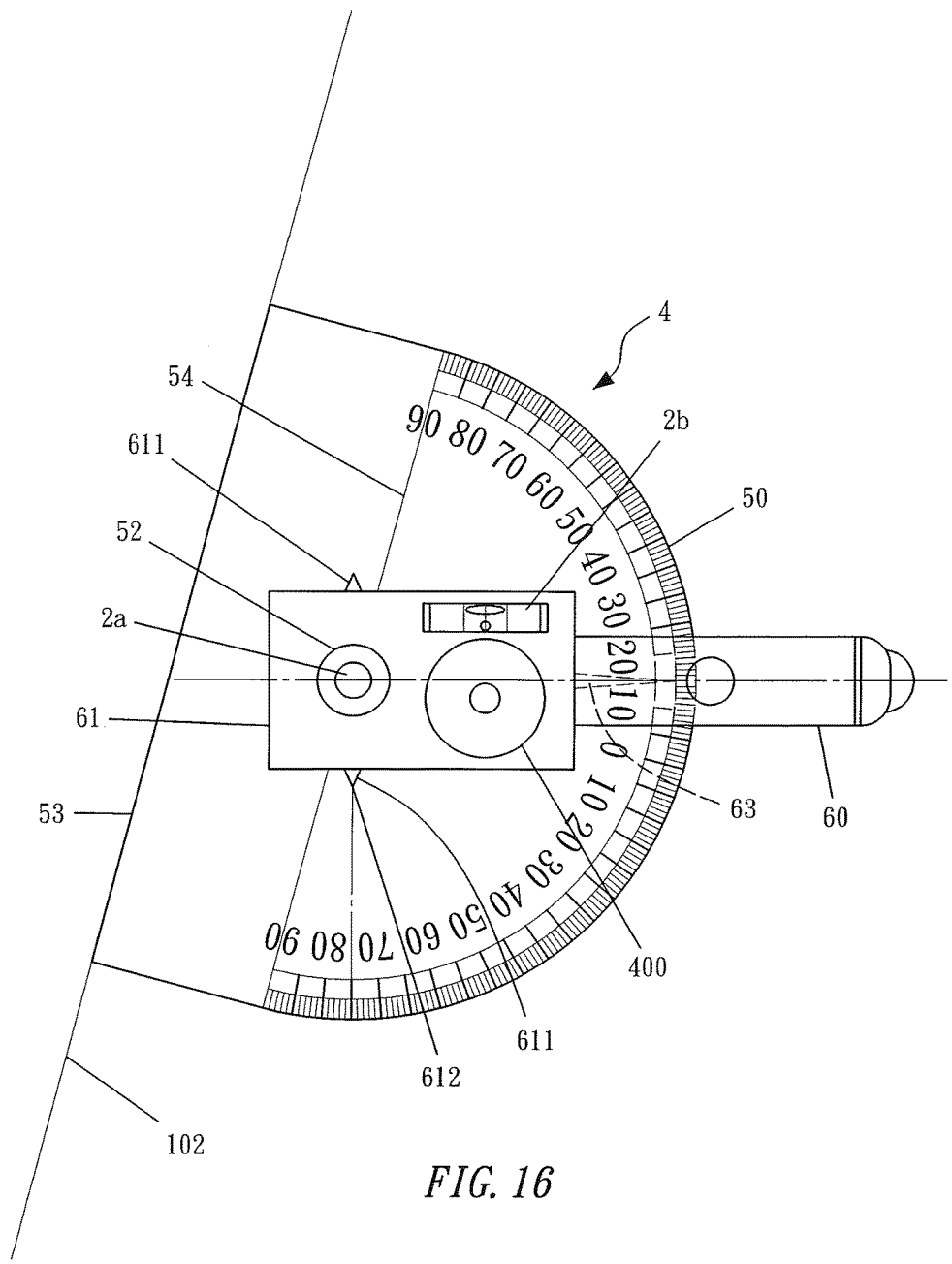
FIG. 16 shows the second type of a double-bead horizontal and vertical spirit level apparatus in accordance with the present invention applied for measuring a vertical tilt angle of a vertical plane of an object.

When the upper surface 100 of an object is examined to determine whether or not the upper surface 100 is horizontal or measure a tilt angle as shown in FIG. 14, the basal surface 53 of the protractor 50 is attached to the upper surface 100 of the object, and then the carrier 61 is pivoted until the double-bead horizontal and vertical spirit level 2b is in a horizontal state. Now, the scale of the protractor 50 corresponsive to the pointer 63 or the pointed-conical end 612 gives the reading of the horizontal tilt angle of the upper surface 100 of the objector shows whether or not the upper surface 100 is horizontal. In FIG. 15, the basal surface 53 of the protractor 50 is attached to the lower surface 101 of the object, and then the carrier 61 is pivoted until the double-bead horizontal and vertical spirit level 2b is in a horizontal state. Now, the scale of the protractor 50 corresponsive to the pointer 63 or the pointed-conical end 612 gives the reading of a horizontal tilt angle of the lower surface 101 of the object and shows whether or not the lower surface 101 is horizontal. In FIG. 16, the basal surface 53 of the protractor 50 is attached to the vertical plane 102 of the object, and then the carrier 61 is pivoted until the double-bead horizontal and vertical spirit level 2b is in a horizontal state. Now, the scale of the protractor 50 corresponsive to the pointer 63 or the pointed-conical end 612 gives the reading of a vertical tilt angle of the vertical plane 102 of the object or shows whether or not the vertical plane 102 is vertical. In a measurement as shown in FIGS. 10~13, the double-bead horizontal and vertical spirit level 2a is maintained at a horizontal state before the double-bead horizontal and vertical spirit level 2b is pivoted to the horizontal state, so as to provide a more accurate measurement.

Figure 17:
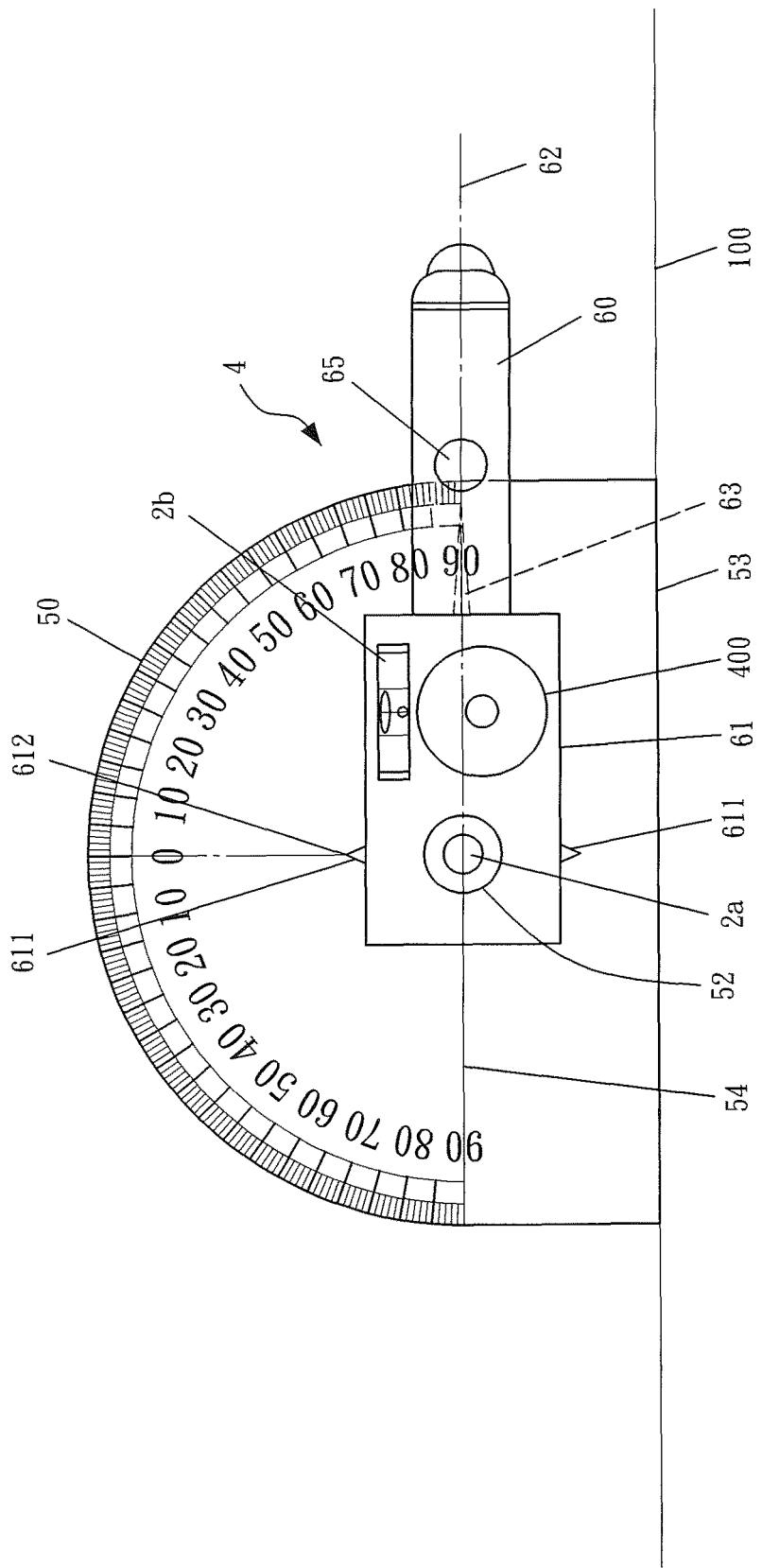
FIG. 17 is a schematic view of the second type of a double-bead horizontal and vertical spirit level apparatus in accordance with the present invention applied for measuring an angle of elevation of an object at a remote end (such as the angle of elevation of a star)

The double-bead horizontal and vertical spirit level apparatus 4 may be used for measuring the angle of elevation of an object where the laser light cannot reach (such as the angle of elevation of a star), and the measuring method is described below. In FIG. 17, the basal surface 53 of the protractor 50 is arranged to face downward, and the double-bead horizontal and vertical spirit level 2a is in a horizontal state to confirm that the protractor plane 500 is vertically erected, and the carrier 61 is pivoted until the double-bead horizontal and vertical spirit level 2b is in a horizontal state, and the carrier 61 is fixed, and the protractor 50 is pivoted until the pointed-conical end 612 or the pointer 63 points at 0° or 90°. Now, the diameter baseline 54 and the long axis 62 of the laser pen 60 are situated at the horizontal state (as shown in FIG. 17), and a switch 65 of the laser pen 60 is pressed to spray mist along the path of the laser light to observe the direction of the laser light or a semi-transparent cube with each side approximately equal to 2 cm~10 cm to vertically block the path of the laser light of the laser pen 60 and observe the direction of the laser light from the semi-transparent cube. The protractor pivots the carrier 61, and the mist is sprayed continuously or the semi-transparent cube is moved accordingly to vertically block the path of the laser light. Until the direction of the laser light of the laser pen 60 is aligned precisely with a star at a remote end, the angle corresponsive to the pointed-conical end 612 or the pointer 63 is the angle of elevation of the star. Similarly, the angle of depression can be measured.

Figure 18:
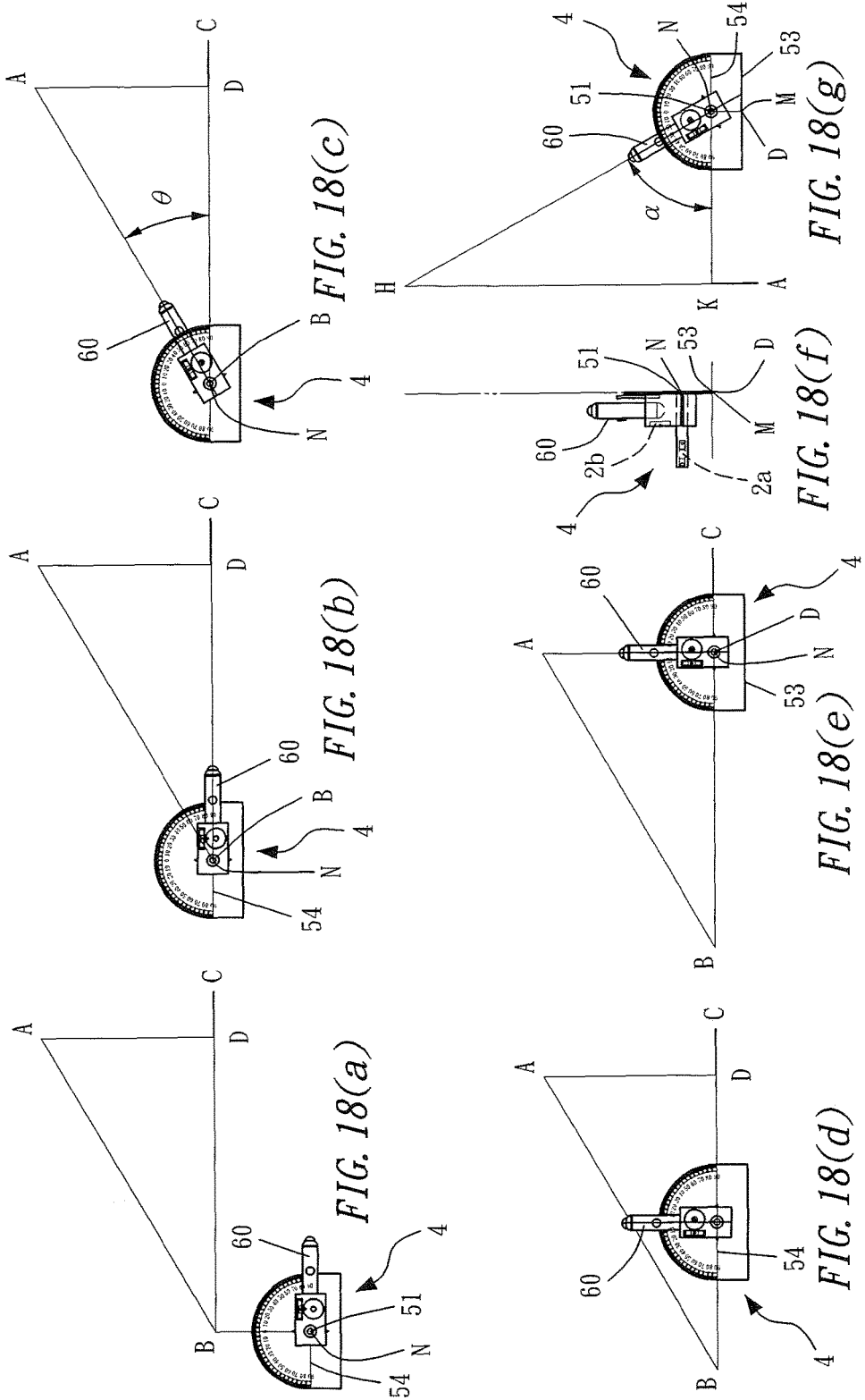
FIGS. 18(a), (b), (c), (d), (e), (f) and (g) are the schematic views of operating the second type of a double-bead horizontal and vertical spirit level apparatus in accordance with the present invention to measure the distance and height of an object at a remote end.

With reference to FIG. 18 for a method of measuring the distance and height of an object at a remote end by using the double-bead horizontal and vertical spirit level apparatus 4, the back side of a protractor 50 is arranged to face downward, and three adjusting screws 93 are used to adjust a circular bubble level 400 to a horizontal state, and the protractor plane 500 is confirmed to be horizontal, then the laser pen 60 is in a horizontal state, and N is set to be the center 51 of the protractor 50, and the position of N is set at a Point B, and a superimposed Line B-C is drawn along a diameter baseline 54, or a laser pen 60 is placed on the diameter baseline 54, so that a laser light is emitted to draw a superimposed Line B-C as shown in FIGS. 18(a) and 18(b). The laser pen 60 is rotated in place at the Point B until the laser light projects at a fixed point A of the object to obtain a pivoting angle θ such as 30° of the laser pen 60 as shown in FIG. 18(c). And then, the laser pen 60 is adjusted to a position of the long axis 62 perpendicular to the diameter baseline 54 as shown in FIG. 18(d). The diameter baseline 54 of the protractor 50 is moved horizontally along Line B-C as shown in FIG. 18(d), until the laser light is projected at the fixed point A of the object at a remote end. Now, the center 51 which is also the position of N is set to Point D as shown in FIG. 18(e), and the plane ABD is set to be a reference horizontal plane. After the distance between the points B and D is measured, the distance between the object at a remote end and the Point D which is also the distance between A and D can be calculated by tan θ×B-D=A-D. The basal surface 53 of the protractor 50 is arranged to face downward, and the double-bead horizontal and vertical spirit level 2a is in a horizontal state to confirm that the protractor plane 500 is vertically erected from the reference horizontal plane, and the diameter baseline 54 is parallel to the reference horizontal plane as shown in FIG. 18(f). In FIG. 18(g), N is the center 51 of the protractor 50, and M is the point of intersection of N perpendicular to the basal surface 53, then to superimpose M and D, and set the diameter baseline 54 to be parallel to Line A-D, and let a basal surface 53 to be superimposed onto the Line A-D, and K is defined as the point of intersection of N perpendicular to AH, and ADNK is a rectangle, and the length of Line A-D=the length of Line K-N and the length of Line A-K=the length of Line M-N. Now, the carrier 61 is pivoted until the laser light of the laser pen 60 is projected at the highest point (or the specific point) H position of the object at a remote end to obtain a pivoting angle α of the laser pen 60, and the equation tan α×K-N=K-H is used to calculate the height of K-H, and the distance between K-H is added to the length of Line N-M to obtain the height of A-H which is the vertical height between the object at a remote end and the reference horizontal plane. If the object is too far or too high for the laser light to reach, a mist may be sprayed along the path of the laser light to observe the direction of the laser light, or a semi-transparent cube with each side approximately equal to 2 cm~10 cm is used to vertically block the path of the laser light to observe the direction of the laser light from the semi-transparent cube. The mist may be sprayed continuously or the semi-transparent cube continuously and vertically blocks the path of the laser light, so that the direction of the laser light is aligned precisely with an object at a remote end.

The double-bead horizontal and vertical spirit level apparatus 4 is to pivot the carrier 61 on the protractor 50, the pivoting means 40d. In FIGS. 10~18, the axial hole 610 of the carrier 61 is sheathed on the pivot 52 perpendicularly protruded from the protractor center 51 as shown in FIGS. 10~18. The pivoting means 40d may also be a pivot perpendicularly protruded downward from the bottom surface of the carrier, and such pivot is inserted into an axial hole of the protractor center 51, wherein the center of the protractor, the center of the axial hole, and the center of the pivot are limited to superimpose at the same point, and the long axis 35 of the double-bead horizontal and vertical spirit level 2b is perpendicular to the axis of the pivot, and all of the long axis 62 of the laser pen, the center axis of the pointer 63, and the connecting line 69 of the two third pointed-conical ends 612 perpendicularly intersect the axis of the pivot. The pointing directions of the two third pointed-conical ends 612 or pointers 63 are perpendicular or parallel to the long axis 35 of the double-bead horizontal and vertical spirit level 2b respectively, and whose opposite direction must pass through the center of the protractor or perpendicularly pass through the axis of the pivot, and the pointing directions of the two third pointed-conical ends 612 or pointers 63 can be used for reading a pivoting angle of the laser pen 60 or the double-bead horizontal and vertical spirit level 2b.

Two double-bead horizontal and vertical spirit levels 2a and 2b of the double-bead horizontal and vertical spirit level apparatus 4 which one or both of 2a and 2b could be replaced with a column bubble level 1 as well if the precise requirement is not stated.

Figure 19:
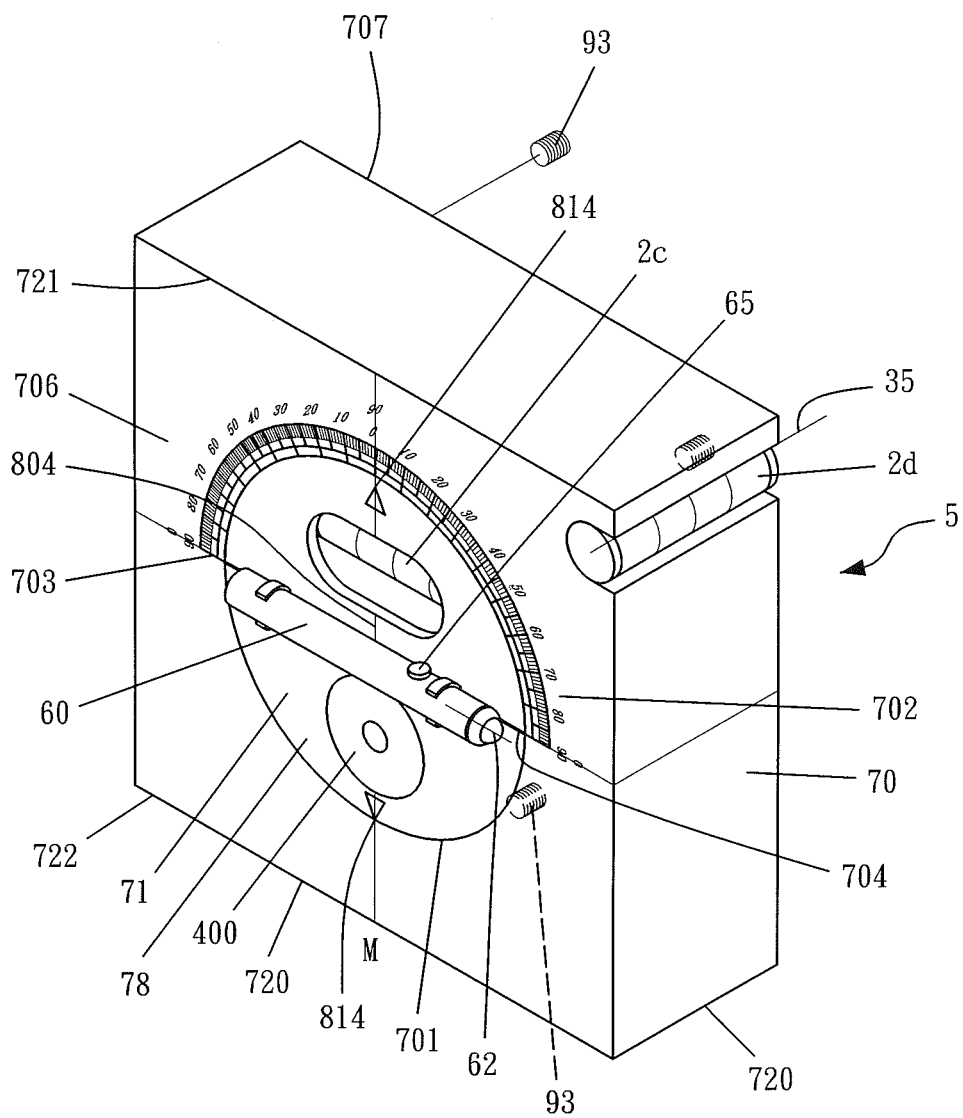
FIG. 19 is a perspective view of a third type of a double-bead horizontal and vertical spirit level apparatus in accordance with the present invention.
Figure 20:
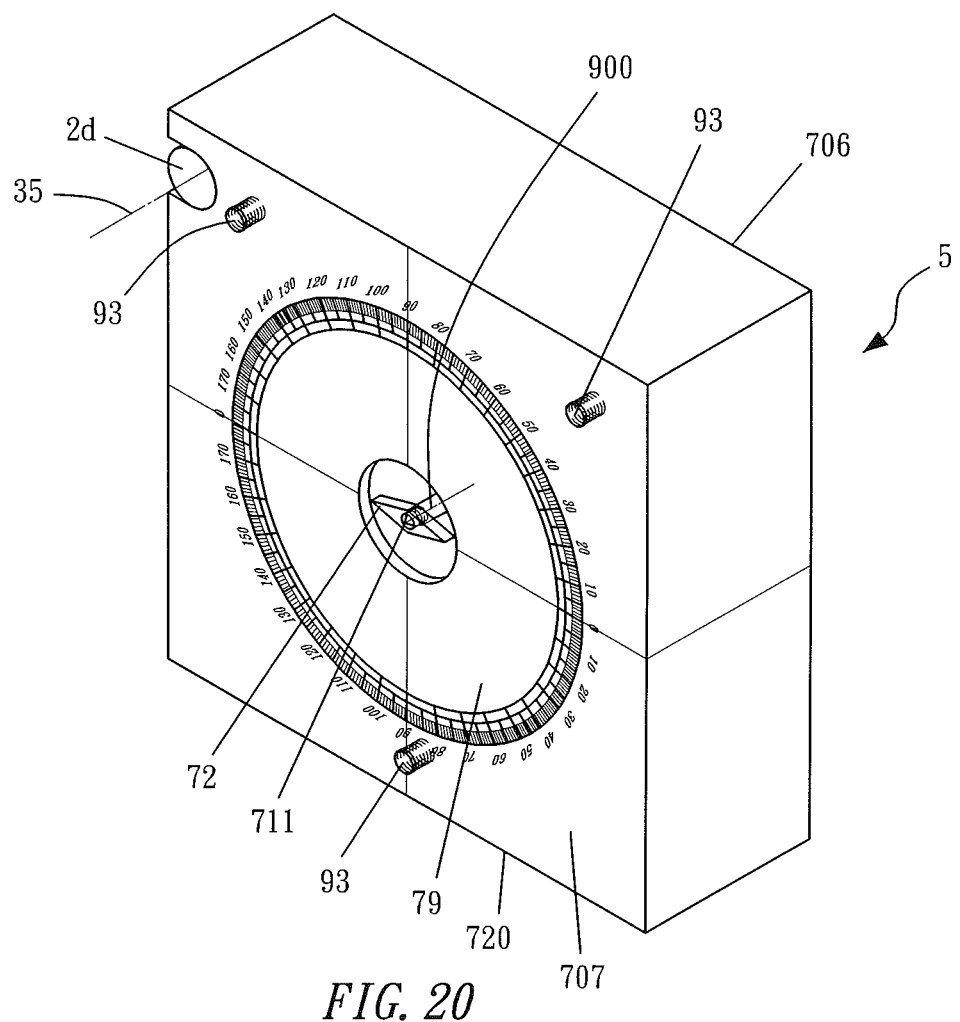
FIG. 20 is a rear view of the third type of a double-bead horizontal and vertical spirit level apparatus in accordance with the present invention.
Figure 21:
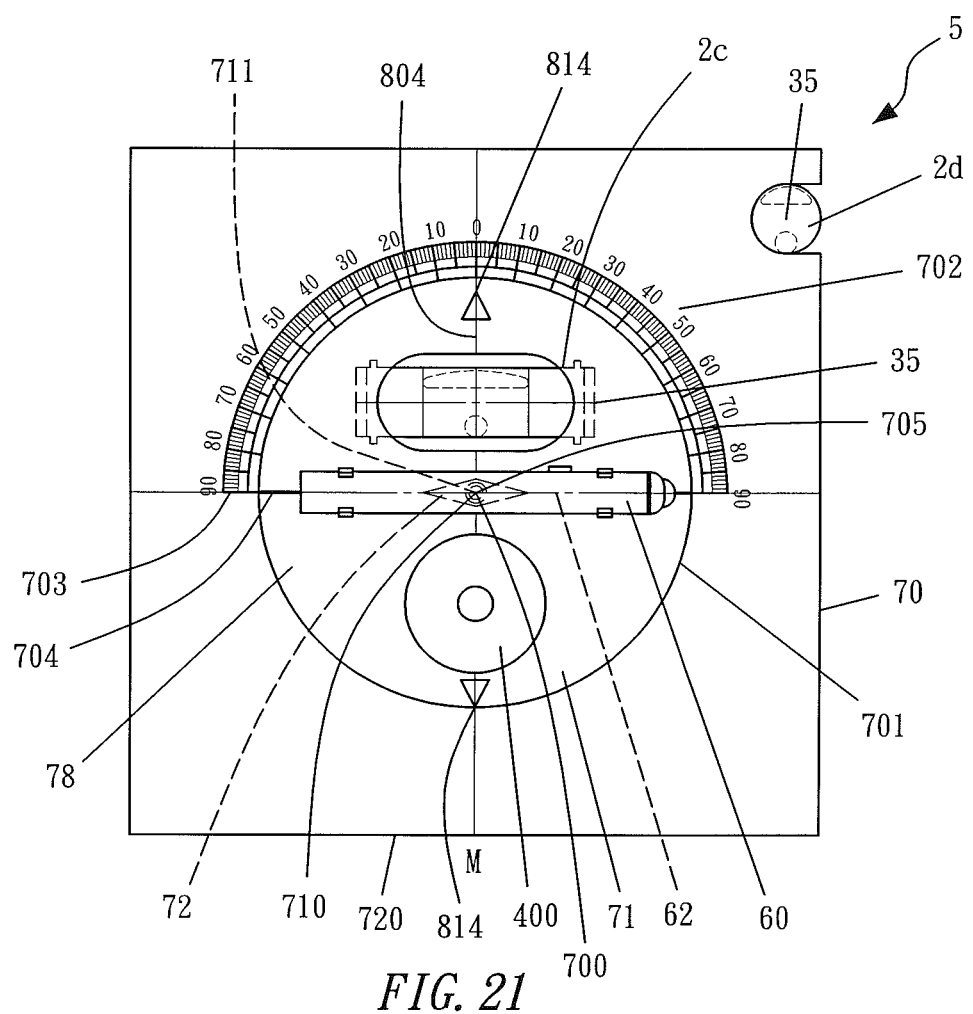
FIG. 21 is a front view of the third type of a double-bead horizontal and vertical spirit level apparatus in accordance with the present invention.

With reference to FIGS. 19~21 for the structure of a third type of a double-bead horizontal and vertical spirit level apparatus 5, the double-bead horizontal and vertical spirit level apparatus 5 comprises a base 70, in a square shape, and having a horizontal axis, a vertical axis and a depth axis perpendicular to one another, and a circular hollow area 701 formed at the middle of the base 70, a front side 706, and a back side 707, and the front side 706 having an angle scale area 702 similar to the protractor surrounding the semicircular area of the hollow area, and the angle scale area 702 having a diameter baseline 703, and both ends of the diameter baseline 703 having a reference scale 0° or 90° or 180°, and the diameter baseline 703 being parallel to a top line 721 and a bottom line 722 of the front side 706; and a basal surface 720, parallel to the diameter baseline 703 and perpendicular to the front side 706. The circular hollow area 701 is coupled to a circular turntable 71 by a rotary mechanism, and four planes (including a front side 78 and a back side 79 of the turntable 71, and a front side 706 and a back side 707 of the base 70) are parallel to one another. A double-bead horizontal and vertical spirit level 2c is fixed on the front side 78 and parallel to the front side 78, and the long axis 35 of the double-bead horizontal and vertical spirit level 2c is parallel to a first specific diameter 704 of the circular turntable 71 as shown in FIG. 21, and the turntable 71 is pivoted until the long axis 35 of the double-bead horizontal and vertical spirit level 2c is parallel to the diameter baseline 703. Now, the first specific diameter 704 is superimposed with the diameter baseline 703. A laser pen 60 is placed on the first specific diameter 704 of the turntable and arranged parallel to the front side 78, and a long axis 62 of the laser pen 60 is superimposed with the first specific diameter 704 at the vertical projection of the front side 78, and a long axis 35 of the double-bead horizontal and vertical spirit level 2c is parallel to the long axis 62 of the laser pen 60. A front-side disk center 710 is defined at the center of the front side of the turntable 71, which is also the center 700 of the diameter baseline 703 and the center 705 of the first specific diameter 704. In other words, the center 700, the center 705 and the front-side disk center 710 are disposed at the same point. A back-side disk center 711 is defined at the center of the back side of the turntable 71, and the vertical projection of the back-side disk center 711 with respect to the front side 78 is the front-side disk center 710, and a connecting line of the front-side disk center 710 and the back-side disk center 711 is the axis 900 of the turntable 71, and the axis 900 is perpendicular to the front side 78 and the back side 79, and the turntable 71 may be pivoted with respect to the axis 900 in the circular hollow area 701. The long axis 62 of the laser pen 60 perpendicularly intersects the axis 900. A surface of the front side 78 of the turntable has a second specific diameter 804 perpendicular to the long axis 35 of the double-bead horizontal and vertical spirit level 2c, and two pointers 814 pointing outward are drawn or carved at both ends of the second specific diameter 804 respectively, and a connecting line of the two pointers 814 is perpendicular to both of the long axis 35 and the long axis 62, and perpendicularly intersects both of the first specific diameter 704 and the axis 900 at all of the center 700, the center 705 and the front-side disk center 710. The reading pointed by the pointer 814 is the reading of a pivoting angle of the laser pen 60 or double-bead horizontal and vertical spirit level 2c. In addition, the reading pointed by the first specific diameter 704 is the reading of a pivoting angle of the laser pen 60 or the double-bead horizontal and vertical spirit level 2c. To facilitate users to observe the reading, two pointers pointing outward are drawn or carved at both ends of the first specific diameter 704.

In addition, a circular bubble level 400 may be placed on the front side 78 of the turntable 71 and parallel to both of the front side 78 of the turntable 71 and the plane of the angle scale area 702. The present invention further comprises another double-bead horizontal and vertical spirit level 2d with a long axis 35 perpendicular to the long axis 35 of the double-bead horizontal and vertical spirit level 2c and parallel to the axis 900. A compass 72 is set on the back side of the double-bead horizontal and vertical spirit level apparatus 5 as shown in FIG. 20, and the center of the compass 72 is the back-side disk center 711, so that the compass 72 can pivot to view direction. The back side 707 of the base 70 is arranged to face downward. The back side 707 has three adjusting screws 93 for adjusting the circular bubble level 400 to a horizontal state and confirming that the front side 706 and the front side 78 are in a horizontal state. In other words, the laser pen 60 is in a horizontal state. The laser pen 60 is rotated to emit a laser light to draw a horizontal line on a wall to replace the application of a laser level. To set the basal surface 720 of the base 70 to face downward and vertically erect the base 70, the double-bead horizontal and vertical spirit level 2d is maintained at a horizontal state to confirm that the front side 706 of the base 70 is vertically erected from the horizontal plane, and the laser pen 60 is rotated to emit a laser light to draw a plumb line of a wall.

Figure 22:
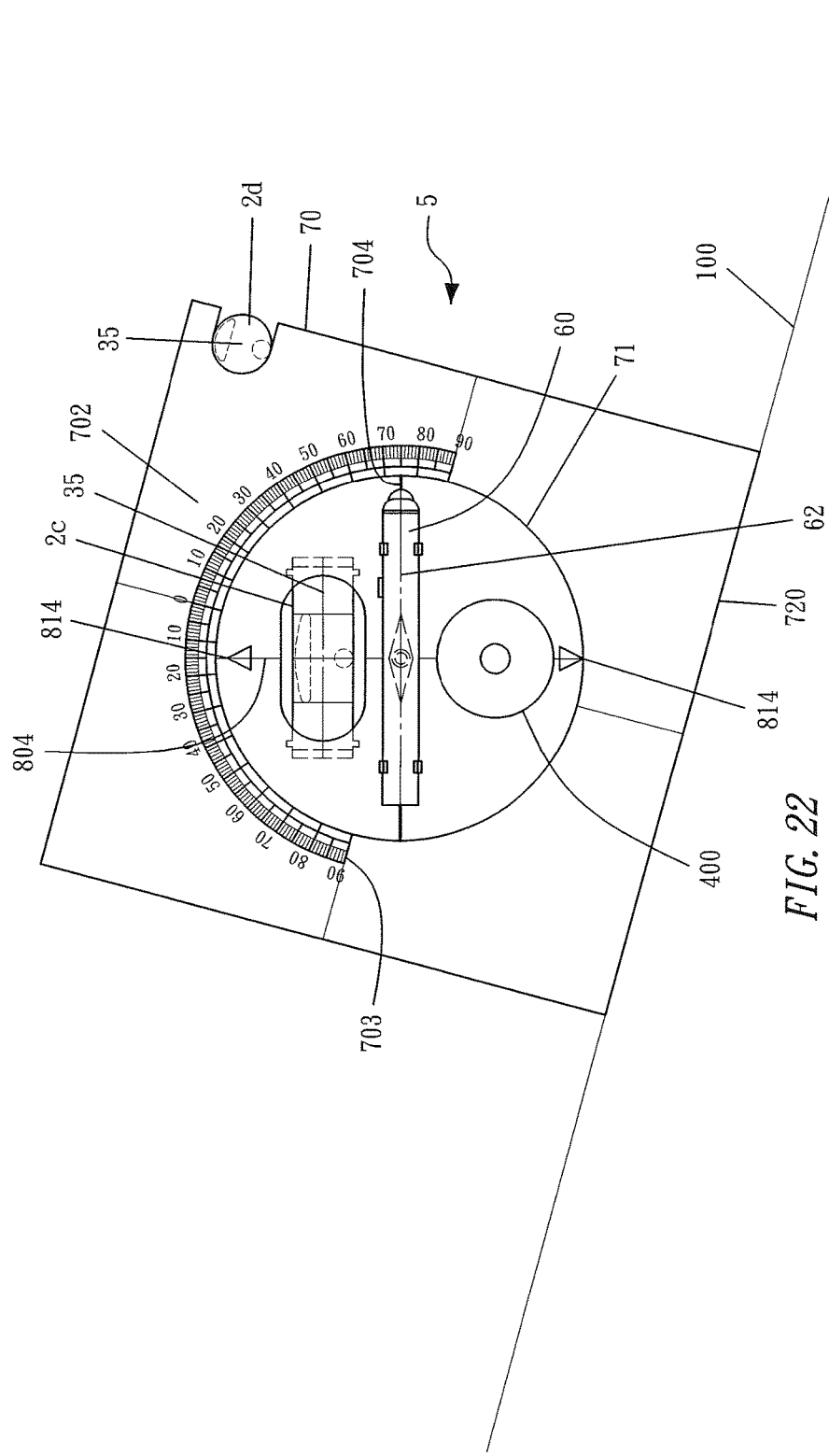
FIG. 22 shows the third type of a double-bead horizontal and vertical spirit level apparatus in accordance with the present invention applied for measuring a horizontal tilt angle of an upper surface of an object.
Figure 23:
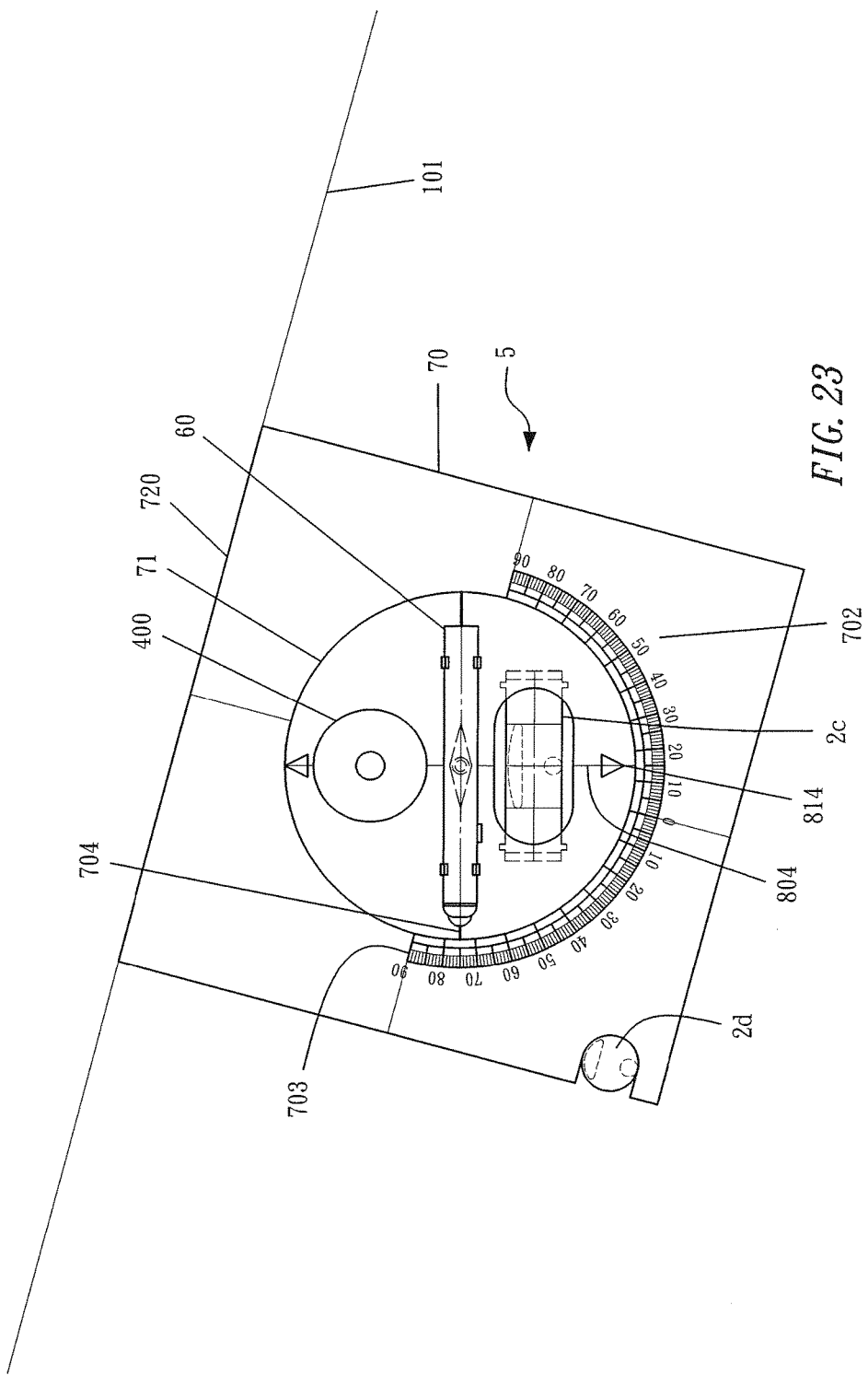
FIG. 23 shows the third type of a double-bead horizontal and vertical spirit level apparatus in accordance with the present invention applied for measuring a horizontal tilt angle of a lower surface of an object.
Figure 24:
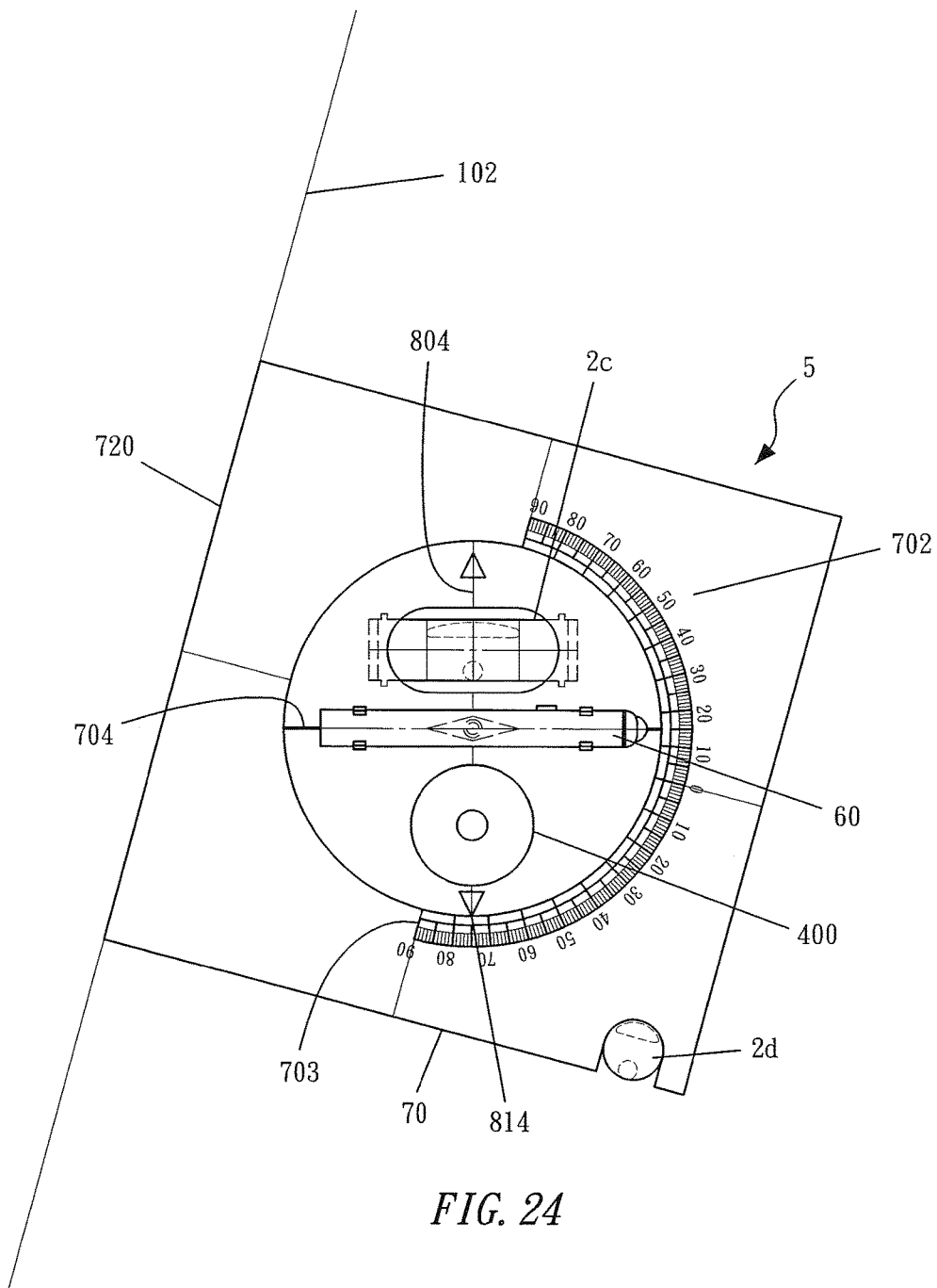
FIG. 24 shows the third type of a double-bead horizontal and vertical spirit level apparatus in accordance with the present invention applied for measuring a vertical tilt angle of a vertical plane of an object.

In the process of checking whether or not the upper surface 100 of an object is horizontal or measuring a tilt angle as shown in FIG. 22, the basal surface 720 of the base 70 is attached to the upper surface 100 of the object, and then the turntable 71 is pivoted until the double-bead horizontal and vertical spirit level 2c is in a horizontal state. Now, the scale of the angle scale area 702 corresponsive to the pointer 814 or the specific diameter 704 gives the reading of a horizontal tilt angle of the upper surface 100 of the object or examines whether or not the upper surface 100 is horizontal. In FIG. 23, the basal surface 720 of the base 70 is attached to the lower surface 101 of the object, and then the turntable 71 is pivoted until the double-bead horizontal and vertical spirit level 2c is in a horizontal state. Now, the scale of the angle scale area 702 corresponsive to the pointer 814 or the specific diameter 704 gives the reading of a horizontal tilt angle of the lower surface 101 of the object or examines whether or not the lower surface 101 is horizontal. In FIG. 24, the basal surface 720 of the base 70 is attached to the vertical plane 102 of the object, and then the pivoting turntable 71 is pivoted until the double-bead horizontal and vertical spirit level 2c is in a horizontal state. Now, the scale of the angle scale area 702 corresponsive to the pointer 814 or first specific diameter 704 gives the reading of a vertical tilt angle of the vertical plane 102 of the objector examines whether or not the vertical plane 102 is vertical. The aforementioned measurement may also attach the top or a lateral side of the base 70 to the object to calculate the tilt angle. In the measurement as shown in FIGS. 22~24, the double-bead horizontal and vertical spirit level 2d is maintained at a horizontal state before the double-bead horizontal and vertical spirit level 2c is pivoted to the horizontal state, so that a more accurate measurement can be achieved.

The double-bead horizontal and vertical spirit level apparatus 5 may also be used for measuring the angle of elevation of an object too far for the laser light to reach such as the angle of elevation of a star, and the method is described below: In FIG. 19, the basal surface 720 of the base 70 is arranged to face downward, and the double-bead horizontal and vertical spirit level 2d is in a horizontal state to confirm that the front side 706 of the base 70 is vertically erected, and the turntable 71 is pivoted until the double-bead horizontal and vertical spirit level 2c is in a horizontal state, and the turntable 71 is fixed, and the base 70 is pivoted until the pointer 814 or the first specific diameter 704 points at 0° or 90°. Now, both of the diameter baseline 703 and the long axis 62 of the laser pen 60 are situated in a horizontal state (as shown in FIG. 19), and a switch 65 of the laser pen 60 is pressed to spray mist in the path of the laser light to observe the direction of the laser light, or a semi-transparent cube with each side approximately equal to 2 cm~10 cm is used to vertically block the path of the laser light of the laser pen 60 in order to observe the direction of the laser light from the semi-transparent cube, and the base 70 is fixed, and the pivoting turntable 71 continues spraying mist, or the semi-transparent cube moves accordingly to vertically block the path of the laser light until the direction of the laser light of the laser pen 60 is aligned precisely with a star at a remote end. Now, an angle corresponsive to the pointer 814 or the first specific diameter 704 is the angle of elevation of the star. Similarly, the angle of depression can be measured.

With reference to FIG. 25 for a method of measuring the distance and height of an object at a remote end by using the double-bead horizontal and vertical spirit level apparatus 5, a back side 707 of a base 70 of the double-bead horizontal and vertical spirit level apparatus 5 is arranged to face downward, and three adjusting screws 93 are provided for adjusting a circular bubble level 400 to a horizontal state, and a front side 706 and a front side 78 are confirmed to be horizontal. In other words, the laser pen 60 is in a horizontal state, and N is set as a front-side disk center 710 of the base 70, and the position of N is set as a Point B, and a Line B-C superimposed with the diameter baseline 703 is drawn (as shown in FIGS. 25(a) and 25(b)). The turntable 71 is rotated in place at the Point B until the laser light is projected at a fixed point A of a desired measuring object at the remote end, the pointer 814 or the first specific diameter 704 shows that the laser light of the laser pen 60 has a pivoting angle θ such as 30° as shown in FIG. 25(c). And then, the laser pen 60 is adjusted to a position of the long axis 62 perpendicular to the diameter baseline 703 as shown in FIG. 25(d). The diameter baseline 703 of the double-bead horizontal and vertical spirit level apparatus 5 is moved horizontally along Line B-C until the laser light is projected at the fixed point A of the object at a remote end. Now, the positions of the center 700, the front-side disk center 710, and the back-side disk center 711 are also the position of N which is set to be Point D as shown in FIG. 25(e), and Plane ABD is set as a reference horizontal plane. After the distance between points B and D is measured, the equation $\tan\theta \times B\text{-}D = A\text{-}D$ is used to calculate the distance between the object at a remote end object and Point D, which is the distance between A and D. Then, the basal surface 720 of the apparatus 5 is arranged to face downward, and the double-bead horizontal and vertical spirit level 2d is used for confirming that the front side 706 of the base 70 is vertically erected from the reference horizontal plane, and the diameter baseline 703 is parallel to the reference horizontal plane as shown in FIG. 25(f). In FIG. 25 (g), N is the disk center 710 of the turntable 71, and M is the point of intersection of N perpendicular to a base bottom line 722, let M and D be superimposed, and the diameter baseline 703 is arranged to be parallel to Line A-D, and let a bottom line 722 of the front side 706 of the base 70 be superimposed onto the Line A-D, and K is defined as the point of intersection of N perpendicular to AH, and ADNK is a rectangle, and the length of Line A-D=the length of Line K-N, and the length of Line A-K=the length of Line M-N. Now, the turntable 71 is pivoted until the laser light of the laser pen 60 is projected to the position of the highest point (or the specific point) H of the object at a remote end, so as to obtain a pivoting angle α of the laser pen 60, and the equation $\tan\alpha \times K\text{-}N = K\text{-}H$ is used to calculate the height of K-H and the distance between K-H plus the length N-M is equal to the height A-H which is also the vertical height between the object at a remote end and the reference horizontal plane. If the object is too far or too high to be reached by the laser light, mist may be spray along the path of the laser light to observe the direction of the laser light or a semi-transparent cube with each side approximately equal to 2 cm~10 cm may be used to vertically block the path of the laser light to observe the direction of the laser light from the semi-transparent cube. The mist may be sprayed continuously or the semi-transparent cube may be used continuously to vertically block the path of the laser light, so that the direction of the laser light can be aligned precisely with the object at a remote end.

Two double-bead horizontal and vertical spirit levels 2c and 2d of the double-bead horizontal and vertical spirit level apparatus 5 which one or both of 2c and 2d could be replaced with a column bubble level 1 as well if the precise requirement is not stated.

In FIGS. 7~25, the double-bead horizontal and vertical spirit levels 2b and 2c have a long axis parallel to the protractor plane 500 or an angle scale area 702 and pivot able with respect to the pivot axis. Both long axes 2b and 2c are perpendicular to the pivot axis but both long axes 2b and 2c are not necessary to intersect the pivot axis. In other words, both long axes 2b and 2c are not necessary to pass the pivot axis. On the other hand, the reading indicator such as the pointer, the pointed-conical end, the first specific diameter and the second specific diameter must be parallel or perpendicular to the long axis of the double-bead horizontal and vertical spirit levels 2b and 2c, and must pass through the center or perpendicularly passing through the pivot axis. The long axes of double-bead horizontal and vertical spirit levels 2b and 2c do not need to pass neither the center of the protractor and the center of the front-side disk nor the axis of the pivot, and the space could be used to install the laser pen.

Therefore, the double-bead horizontal and vertical spirit level of the present invention may add a bead insoluble in the basic liquid and having a density greater than that of the basic liquid into the transparent tube, so that the double-bead horizontal and vertical spirit level can be used as a horizontally measuring tool of the upper and lower surfaces of an object as well as a vertical plane measuring tool of the object, so that the simple double-bead horizontal and vertical spirit level has a broader scope of applicability. With the comparison of the relative positions of the two beads, a more accurate and practical application can be achieved. The double-bead horizontal and vertical spirit level apparatus may be used for measuring the horizontal tilt reading of the upper surface and the lower surface and the vertical tilt reading of the vertical plane, and a laser may be used to draw a horizontal line or a vertical line and to measure the angle of elevation of an object too far for the laser light to reach (such as the angle of elevation of a star) and measure the distance and height of an object at a remote end.

What is claimed is:

1. A double-bead horizontal and vertical spirit level is characterized in that in addition to having a basic liquid and a bubble filled in a transparent tube, the transparent tube further includes a bead which is insoluble in the basic liquid and has a density greater than that of the basic liquid.

2. The double-bead horizontal and vertical spirit level according to claim 1, wherein the bead is a liquid, colloid, or solid bead.

3. The double-bead horizontal and vertical spirit level according to claim 1, wherein the internal tube diameter of the transparent tube is either tapered from the middle position to both ends, therefore the transparent tube has the maximum internal tube diameter at the middle position and the minimum internal tube diameter at both ends or the internal tube diameter is all the same in whole tube.

4. The double-bead horizontal and vertical spirit level according to claim 3, wherein the transparent tube has a base disposed separately at both ends passing through a long axis of the center of the transparent tube, and the bottom surfaces of the two bases and the connected surface of the two bottom surfaces are parallel to the long axis of the transparent tube, and the vertical end surfaces of both outer ends of the two bases are perpendicular the bottom surface of the base, and perpendicular the top surface of the base, and perpendicular the long axis, and the horizontal axis, vertical axis and depth axis of the two bases are perpendicular to one another.

5. A double-bead horizontal and vertical spirit level apparatus, comprising a double-bead horizontal and vertical spirit level according to claim 1 and a protractor, wherein a long axis of the double-bead horizontal and vertical spirit level parallel to the protractor plane and the long axis of the double-bead horizontal and vertical spirit level has one end fixed to a pivoting base, and the other end fixed to a rotated base, and center positions of the protractor and the pivoting base are pivotally coupled by a pivoting means, and the pivoting means includes an axial hole and a pivot, an axis of the pivot and an axis of the axial hole are perpendicular to the protractor plane, and perpendicular to the bottom surface of the pivoting base, and the pivot is passed into and pivotally coupled to the axial hole; either the axial hole or the pivot is disposed at the center position of the protractor, and the other one is disposed on the pivoting base, and the axis of the pivot is limited to pass through the center of the protractor, and the axis passing through the center of the axial hole is superimposed with the axis of the pivot, and both the center of the protractor and the center of the axial hole are superimposed at the same point; and the axial hole has a hole diameter substantially equal to the external diameter of the pivot, and the double-bead horizontal and vertical spirit level is pivot able on the protractor, and the long axis of the double-bead horizontal and vertical spirit level is perpendicular to the axis of the pivot; the double-bead horizontal and vertical spirit level of the double-bead horizontal and vertical spirit level apparatus could be replaced with a column bubble level as well if the precise requirement is not stated.

6. The double-bead horizontal and vertical spirit level apparatus according to claim 5, wherein the pivoting base has two sidewalls parallel to the axis of the pivot and also parallel to the long axis of the double-bead horizontal and vertical spirit level and each of the two sidewalls has a first isosceles triangle indicating cone, and each of the these two first isosceles triangles indicating cones has a first pointer at a first pointed-conical end, and the connecting line at equal-height positions of these two pointed-conical ends is perpendicular to the long axis of the double-bead horizontal and vertical spirit level and perpendicularly intersects with the axis of the pivot; and there is a second isosceles triangle indicating cone, and which has a second pointer at a second pointed-conical end, and the second pointer is located on the pivoting base or the rotated base with a pointing direction parallel to the pointing direction of the long axis of the double-bead horizontal and vertical spirit level; and the first and second pointer have the pointing direction perpendicular or parallel to the long axis of the double-bead horizontal and vertical spirit level respectively, and whose opposite directions must pass through the center of the protractor or perpendicularly pass through the axis of the pivot, and the pointing directions of the first and second pointer indicate a pivoting angle reading of the double-bead horizontal and vertical spirit level; if there is another double-bead horizontal and vertical spirit level with the long axis perpendicular to the protractor plane is added, the measurement will be more accurate.

7. A double-bead horizontal and vertical spirit level apparatus, comprising two double-bead horizontal and vertical spirit levels according to claim 1, a protractor and a laser pen, wherein the center position of the protractor is pivotally coupled to a carrier by a pivoting means, and the pivoting means includes an axial hole and a pivot, an axis of the pivot and an axis of the axial hole are perpendicular to the protractor plane, and perpendicular to the bottom surface of the carrier, and the pivot is passed into the axial hole and pivotally coupled to the axial hole, and one of the axial hole and the pivot is disposed at the center position of the protractor, and the other one is disposed on the carrier, and the axis of the pivot passing through the center of the protractor, and both the center of the protractor and the center of the axial hole are superimposed at the same point; the laser pen is fixed onto the carrier, and the first double-bead horizontal and vertical spirit level is also disposed on the carrier, so that the first double-bead horizontal and vertical spirit level and the laser pen can be pivoted on the carrier; and the first double-bead horizontal and vertical spirit level has a long axis perpendicular to the axis of the pivot and parallel to a long axis of the laser pen, and a pointer is disposed precisely under the laser pen and parallel to the long axis of the laser pen, and a center axis of the pointer with respect to a vertical projection of a plane of the protractor and the long axis of the laser pen with respect to the vertical projection of the plane of the protractor are superimposed, and the long axis of the laser pen and the center axis of the pointer perpendicularly intersect the axis of the pivot, and the pointer is provided for indicating a pivoting angle reading of the laser pen or the first double-bead horizontal and vertical spirit level; and the carrier has two sidewalls parallel to the axis of the pivot and parallel to the long axis of the first double-bead horizontal and vertical spirit level, and each of the two sidewalls has a third isosceles triangle indicating cone, and each of the two third isosceles triangle indicating cones has a third pointer at a third pointed-conical end, and a connecting line of the two third pointed-conical ends at equal-height position is perpendicular to the long axis of the first double-bead horizontal and vertical spirit level and perpendicularly intersects the axis of the pivot, and the two third pointers are provided for indicating a pivoting angle reading of the laser pen or the first double-bead horizontal and vertical spirit level; the second double-bead horizontal and vertical spirit level may be installed at any position of the double-bead horizontal and vertical spirit level apparatus as long as the long axis of the second double-bead horizontal and vertical spirit level is parallel to the axis of the pivot, and perpendicular to the long axis of the first double-bead horizontal and vertical spirit level and the long axis of the laser pen; the pointer and the third pointer have the pointing directions parallel or perpendicular to the long axis of the first double-bead horizontal and vertical spirit level respectively, and whose opposite direction passes through the center of the protractor or perpendicularly passes through the axis of the pivot; the long axis of the first double-bead horizontal and vertical spirit level does not need to pass neither the center of the protractor nor the axis of the pivot, and the space could be used to install the laser pen; two double-bead horizontal and vertical spirit levels of the double-bead horizontal and vertical spirit level apparatus which one or both could be replaced with a column bubble level as well if the precise requirement is not stated.

8. A method of measuring the distance and height of an object at a remote end by using the double-bead horizontal and vertical spirit level apparatus according to claim 7, comprising the steps of:

Step 1: confirming that the back side of the protractor is arranged to face downward, and the protractor plane is horizontally;

Step 2: setting the position of the center N of the projector at a Point B, and drawing a Line B-C superimposed with the diameter baseline;

Step 3: rotating the laser pen in place at the Point B until the laser pen projects a laser light at a fixed point A of the targeting object at the remote end to obtain a pivoting angle θ of the laser pen, and then adjusting the long axis of the laser pen to a position perpendicular to the diameter baseline and moving the protractor with the diameter baseline along the Line B-C until the laser light projects at the fixed point A of the targeting object at the remote end, and setting the position of the center Point N of the protractor as Point D, and setting a plane ABD as a reference horizontal plane;

Step 4: measuring the distance between points B and D, and then calculating the distance A-D between the targeting object A and the Point D by tan θ×B-D=A-D;

Step 5: using the second double-bead horizontal and vertical spirit level which is in a horizontal state to confirm that a basal surface of the protractor is arranged to face downward and the protractor plane perpendicularly erects on the reference horizontal plane, and set the diameter baseline of the protractor to be parallel to the Line A-D, and let a basal surface of the protractor be superimposed onto the Line A-D, and defining M as a point of intersection of the basal surface perpendicular to the center N of the protractor, and superimpose Point M with Point D, and then pivotally rotating the laser pen to project a laser at a position of either the highest point or the specific point H of the targeting object at the remote end to obtain a pivoting angle α of the laser pen; defining K as a point of intersection of N perpendicular to A-H, and obtaining the height of K-H by tan α×K-N=K-H, and calculating the vertical height A-H between the targeting object at the remote end and the reference horizontal plane by the sum of the distance between K-H and the distance between M-N.

9. A double-bead horizontal and vertical spirit level apparatus, comprising the two double-bead horizontal and vertical spirit levels according to claim 1, a laser pen, and a base, wherein a horizontal axis, vertical axis and depth axis of the base are perpendicular to one another, and the middle of the base has a circular hollow area, and the base has an angle scale area similar to a protractor disposed on a front side of the base and configured to be corresponsive to a semicircular area of a hollow area and also has a diameter baseline, and both ends of the diameter baseline are carved with a reference scale 0° or 90° or 180°, and the diameter baseline is parallel to a top line and a bottom line of the front side; and a basal surface, parallel to the diameter baseline and perpendicular to the front side of the base; a circular turntable is coupled to the circular hollow area by a rotary mechanism, and both front side and back side of a turntable has a disk center, and a connecting line of the two disk center is an axis of the turntable, and the axis of the turntable is perpendicular to both front and back sides, and the turntable is pivoted with respect to the axis in the circular hollow area, and the first double-bead horizontal and vertical spirit level is fixed to the front side of the turntable and parallel to the front side of the turntable, and a long axis of the first double-bead horizontal and vertical spirit level is parallel to a first specific diameter of the circular turntable and the turntable is pivoted to the long axis of the first double-bead horizontal and vertical spirit level parallel to the diameter baseline, and then the first specific diameter is superimposed with the diameter baseline; the laser pen is placed on the first specific diameter of the turntable, and a long axis of the laser pen is superimposed with the first specific diameter at the vertical projection of the front side of the turntable; the turntable has a second specific diameter disposed on a disk surface and perpendicular to the first specific diameter, and both ends of the second specific diameter have two pointers pointing outward, and a connecting line of the two pointers is perpendicular to the long axis of the laser pen and the long axis of the first double-bead horizontal and vertical spirit level and perpendicular passing through the first specific diameter, and the axis of the turntable and passing through the front-side disk center of the turntable; the reading indicated by the two pointers, or the reading of the first specific diameter are pivoting angle readings of the laser pen or the first double-bead horizontal and vertical spirit level; the second double-bead horizontal and vertical spirit level is installed on the base and at a position that a long axis of the second double-bead horizontal and vertical spirit level parallel to the axis of the turntable and perpendicular to the long axis of the first double-bead horizontal and vertical spirit level, and the long axis of the laser pen; the first specific diameter and the two pointers of the second specific diameter have a pointing direction parallel or perpendicular to the long axis of the first double-bead horizontal and vertical spirit level respectively, and the center of the angle scale area similar to the protractor, the disk center of the front side of the turntable, and the centers with the first specific diameter and the second specific diameter are superimposed on the same point; the long axis of the first double-bead horizontal and vertical spirit level does not need to pass neither the center of front-side disk nor the axis of the pivot, the space could be used to install the laser pen; two double-bead horizontal and vertical spirit levels of the double-bead horizontal and vertical spirit level apparatus which one or both could be replaced with a column bubble level as well if the precise requirement is not stated.

10. A method of measuring the distance and height of an object at a remote end by using the double-bead horizontal and vertical spirit level apparatus according to claim 9, comprising the steps of:

Step 1: confirming that the back side of the base is arranged to face downward, and the front side of the base, and the front side of the turntable are horizontal;

Step 2: setting the position of disk center N of the turntable at a Point B, and drawing a Line B-C superimposed with the diameter baseline;

Step 3: rotating the turntable in place at the Point B until the laser pen projects a laser at a fixed point A of the targeting object at the remote end to obtain a pivoting angle θ of the laser pen, and then adjusting the long axis of the laser pen to a position perpendicular to the diameter baseline and moving the base, and let the diameter baseline to move along the Line B-C until the laser pen projects the laser at the fixed point A of the targeting object at the remote end, and setting the position of the center Point N of the turntable as Point D, and setting a plane ABD as a reference horizontal plane;

Step 4: measuring the distance between points B and D, and then calculating the distance A-D between the targeting object A and the Point D by tan θ×B-D=A-D;

Step 5: using the second double-bead horizontal and vertical spirit level which is in a horizontal state to confirm that a basal surface of the base faces downward and the front side of the base perpendicularly erects on the reference horizontal plane, so that the angle scale area is perpendicular to the reference horizontal plane, and the diameter baseline of the angle scale area is parallel to the Line A-D, and let a bottom line of the front side of the base be superimposed onto the Line A-D, and defining M as a point of intersection of the basal surface perpendicular to the center N, and superimposing Point M with Point D, and then pivotally rotating the laser pen to project the laser at a position of either the highest point or the specific point H of the targeting object at the remote end to obtain a pivoting angle α of the laser pen; defining K as a point of intersection of N perpendicular to A-H, and obtaining the height of K-H by tan α×K-N=K-H, and calculating the vertical height A-H between the targeting object at the remote end and the reference horizontal plane by the sum of the distance between K-H and the distance between M-N.

* * * * *